US010298810B2

(12) United States Patent
Nobutani et al.

(10) Patent No.: US 10,298,810 B2
(45) Date of Patent: May 21, 2019

(54) AUTHENTICATION DEVICE AND AUTHENTICATION METHOD

(71) Applicant: FUJI XEROX CO., LTD., Tokyo (JP)

(72) Inventors: Naoya Nobutani, Yokohama (JP); Masafumi Ono, Yokohama (JP); Manabu Hayashi, Yokohama (JP); Kunitoshi Yamamoto, Yokohama (JP); Toru Suzuki, Yokohama (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/994,903

(22) Filed: Jan. 13, 2016

(65) Prior Publication Data

US 2017/0041503 A1 Feb. 9, 2017

(30) Foreign Application Priority Data

Aug. 3, 2015 (JP) ................. 2015-153704

(51) Int. Cl.
| | |
|---|---|
| H04N 1/44 | (2006.01) |
| G06F 21/32 | (2013.01) |
| G06K 9/00 | (2006.01) |
| H04N 1/00 | (2006.01) |
| H04B 1/00 | (2006.01) |
| G06F 3/12 | (2006.01) |

(52) U.S. Cl.
CPC ......... *H04N 1/442* (2013.01); *G06K 9/00255* (2013.01); *G06K 9/00295* (2013.01); *H04N 1/00336* (2013.01); *H04N 2201/0094* (2013.01)

(58) Field of Classification Search
CPC .......... G06F 21/32; G06F 21/41; G06F 21/51; G06F 21/52; G06F 21/608; G06F 2221/2141; G06K 15/406; G06K 9/00221; H04N 1/00323; H04N 1/00336; H04N 1/00891; H04N 1/00896; H04N 1/00904; H04N 2201/0094; H04N 2201/0098
USPC ........ 358/1.11–1.18; 382/118; 713/182–186, 713/300, 320, 323, 324, 330, 340; 726/26–33
See application file for complete search history.

(56) References Cited

U.S. PATENT DOCUMENTS

2006/0078173 A1* 4/2006 Isomura ................. G06T 11/60
382/118
2009/0091420 A1* 4/2009 Dobashi ............. G06K 9/00288
340/5.2
(Continued)

FOREIGN PATENT DOCUMENTS

| | | |
|---|---|---|
| JP | 2007-148988 A | 6/2007 |
| JP | 2013-69155 A | 4/2013 |

(Continued)

*Primary Examiner* — Chad Dickerson
(74) *Attorney, Agent, or Firm* — Sughrue Mion, PLLC

(57) ABSTRACT

An authentication device includes: an image capturing unit that captures an image of a person around an apparatus including the authentication device; an authentication unit that performs authentication by a facial image captured by the image capturing unit; and a selection unit, when the image capturing unit captures facial images of plural persons, that selects a facial image of a person who is determined to have a high possibility of using the apparatus from the facial images of the plural persons.

20 Claims, 17 Drawing Sheets

(56) References Cited

U.S. PATENT DOCUMENTS

| | | | |
|---|---|---|---|
| 2009/0096871 A1* | 4/2009 | Kuwano | G06K 9/00228 348/169 |
| 2009/0148006 A1* | 6/2009 | Hayasaki | G06K 9/00221 382/118 |
| 2013/0063581 A1* | 3/2013 | Komatsu | G06K 9/00288 348/77 |
| 2013/0335640 A1* | 12/2013 | Watanabe | G06F 3/017 348/744 |
| 2014/0104636 A1* | 4/2014 | Baba | H04N 1/00323 358/1.14 |
| 2014/0118520 A1* | 5/2014 | Slaby | G06K 9/00926 348/77 |
| 2015/0002877 A1* | 1/2015 | Ono | G06K 15/4055 358/1.14 |
| 2015/0049361 A1* | 2/2015 | Hirose | G06F 3/1204 358/1.15 |
| 2015/0049923 A1* | 2/2015 | Nobutani | G06F 21/41 382/118 |
| 2015/0221151 A1* | 8/2015 | Bacco | G07C 9/00087 340/5.83 |
| 2017/0039010 A1* | 2/2017 | Nobutani | G06F 3/1222 |

FOREIGN PATENT DOCUMENTS

| | | | |
|---|---|---|---|
| JP | 2013069155 A | * | 4/2013 |
| JP | 2015-11537 A | | 1/2015 |

* cited by examiner

FIG.10A  REGISTRATION TABLE

| REGISTRATION ID | REGISTERED PERSON INFORMATION ||||| FACIAL INFORMATION |
|---|---|---|---|---|---|
| | USER NAME | APPLICATION NAME | APPLICATION FUNCTION | BUTTON DESIGN | |
| R001 | FUJI TARO | SIMPLE COPY | ..... | ..... | ..... |
| | | AUTOMATIC SCAN | ..... | ..... | |
| | | SIMPLE BOX STORAGE | ..... | ..... | |
| | | BOX OPERATION | ..... | ..... | |
| | | FAX | ..... | ..... | |
| | | PRIVATE PRINT (BUTCH OUTPUT) | ..... | ..... | |
| R002 | FUJI HANAKO | SIMPLE COPY | ..... | ..... | ..... |
| | | AUTOMATIC SCAN | ..... | ..... | |
| | | SIMPLE BOX STORAGE | ..... | ..... | |
| | | PRIVATE PRINT (SIMPLE CONFIRMATION) | ..... | ..... | |
| | | REGULAR 3 COPIES | ..... | ..... | |
| | | SAVING COPY | ..... | ..... | |
| | | ONE-TOUCH START PRINT | ..... | ..... | |
| | | VERY FINE SCAN | ..... | ..... | |

FIG.10B  TRACKING TABLE

| TRACKING ID | FACIAL INFORMATION |
|---|---|
| C001 | ..... |
| C002 | ..... |
| C003 | ..... |

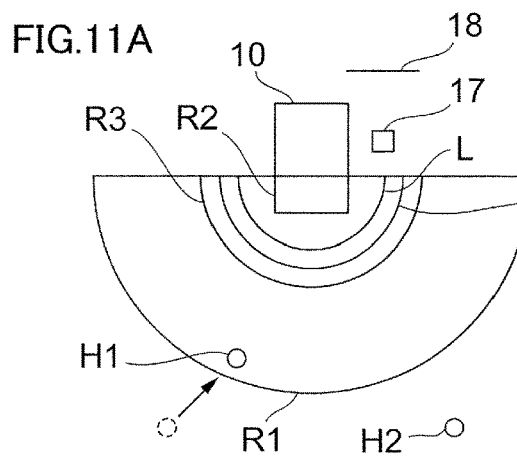
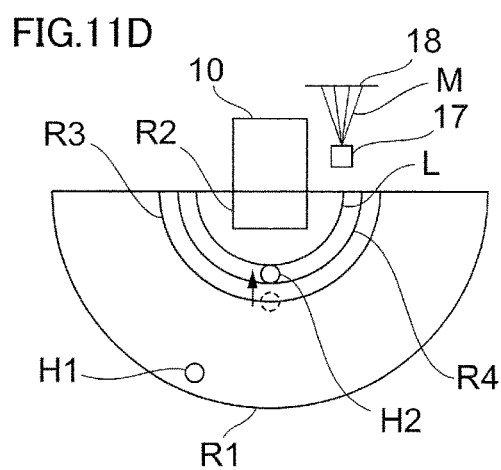
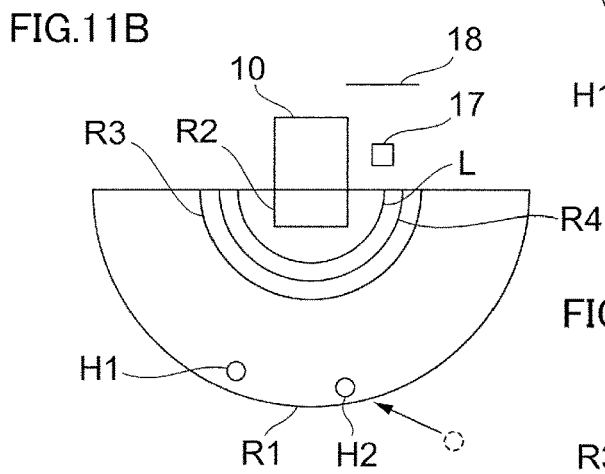
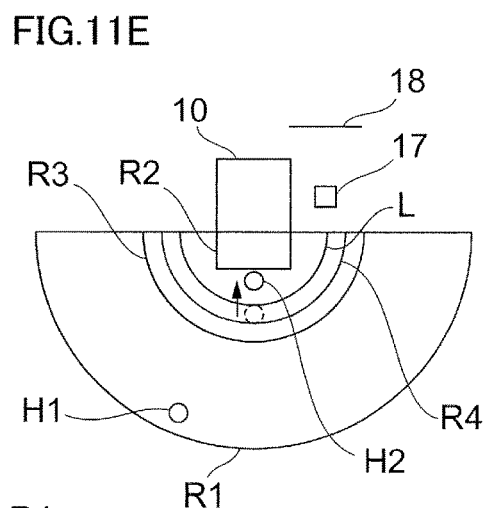
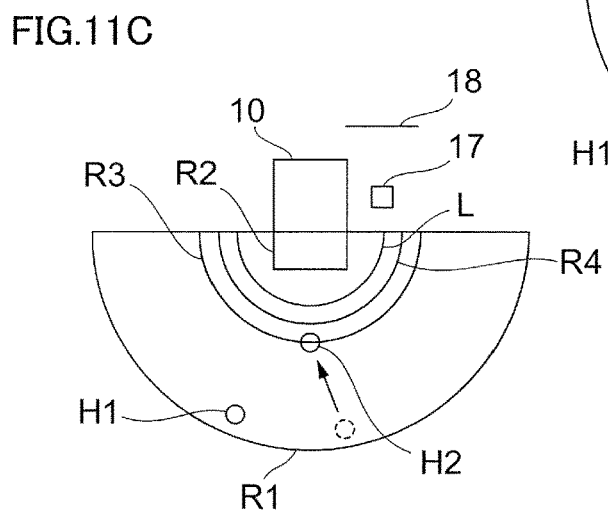

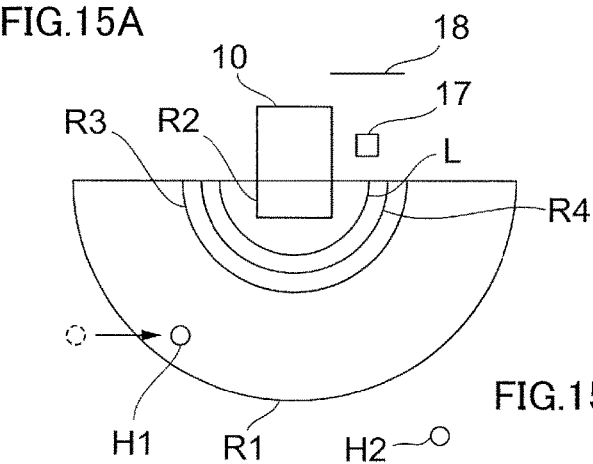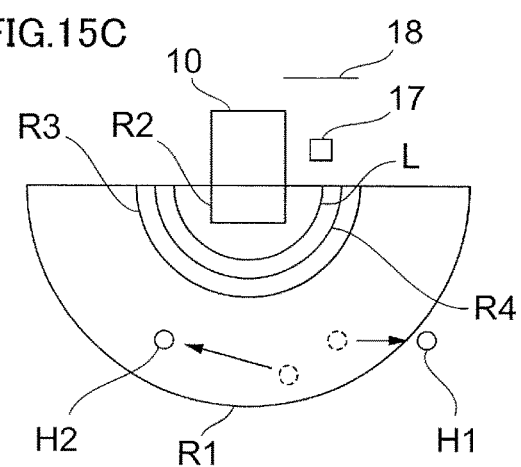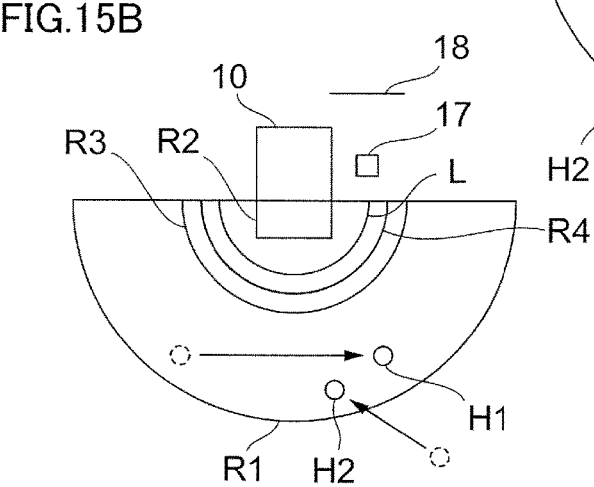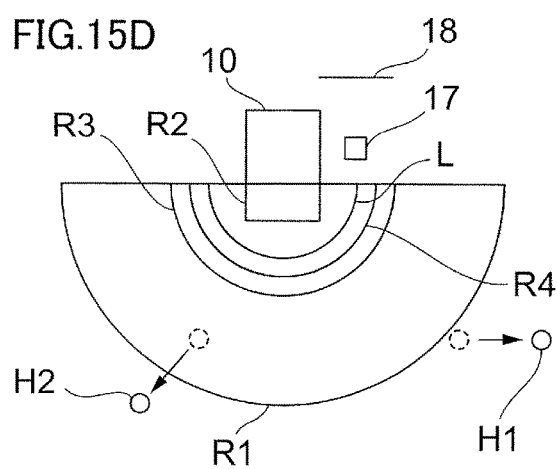

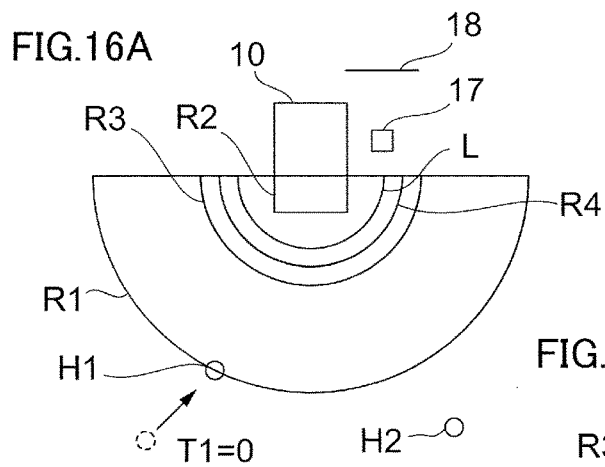
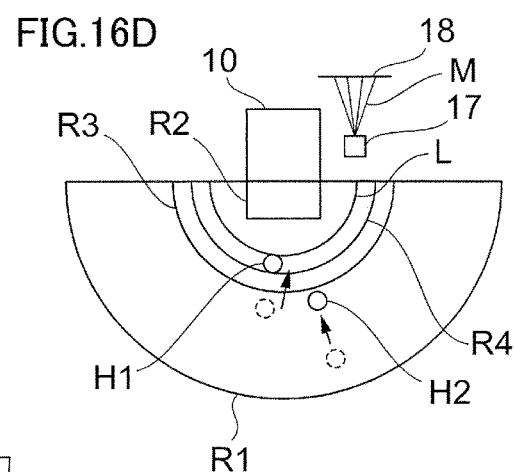
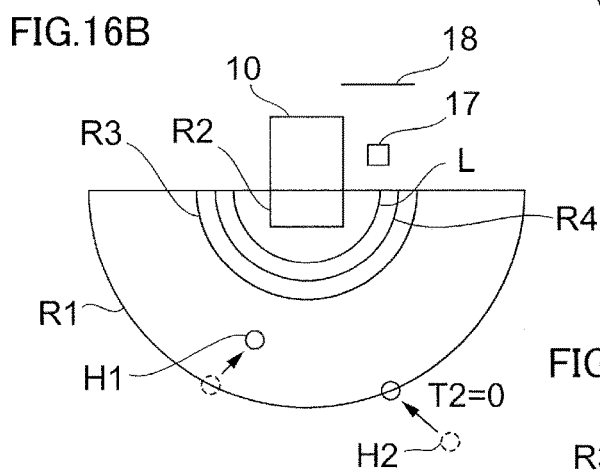
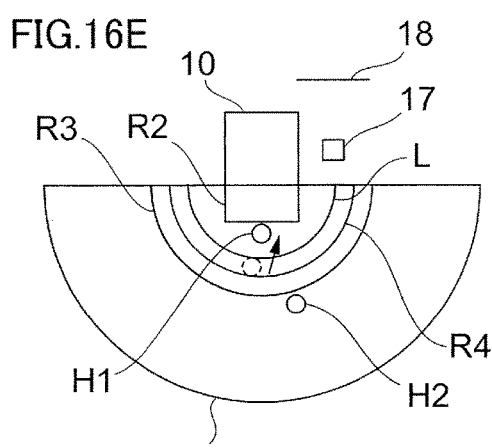
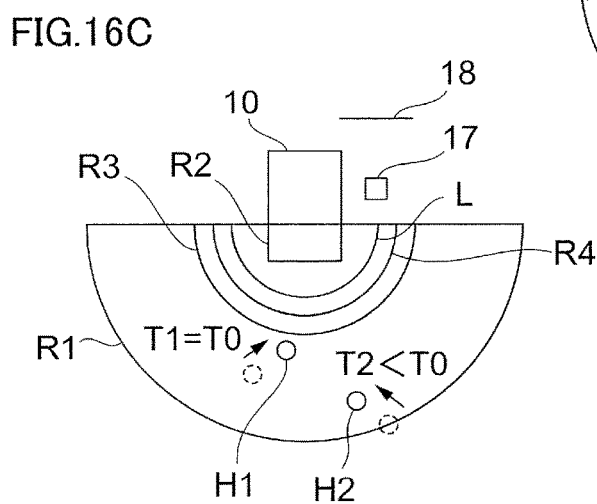

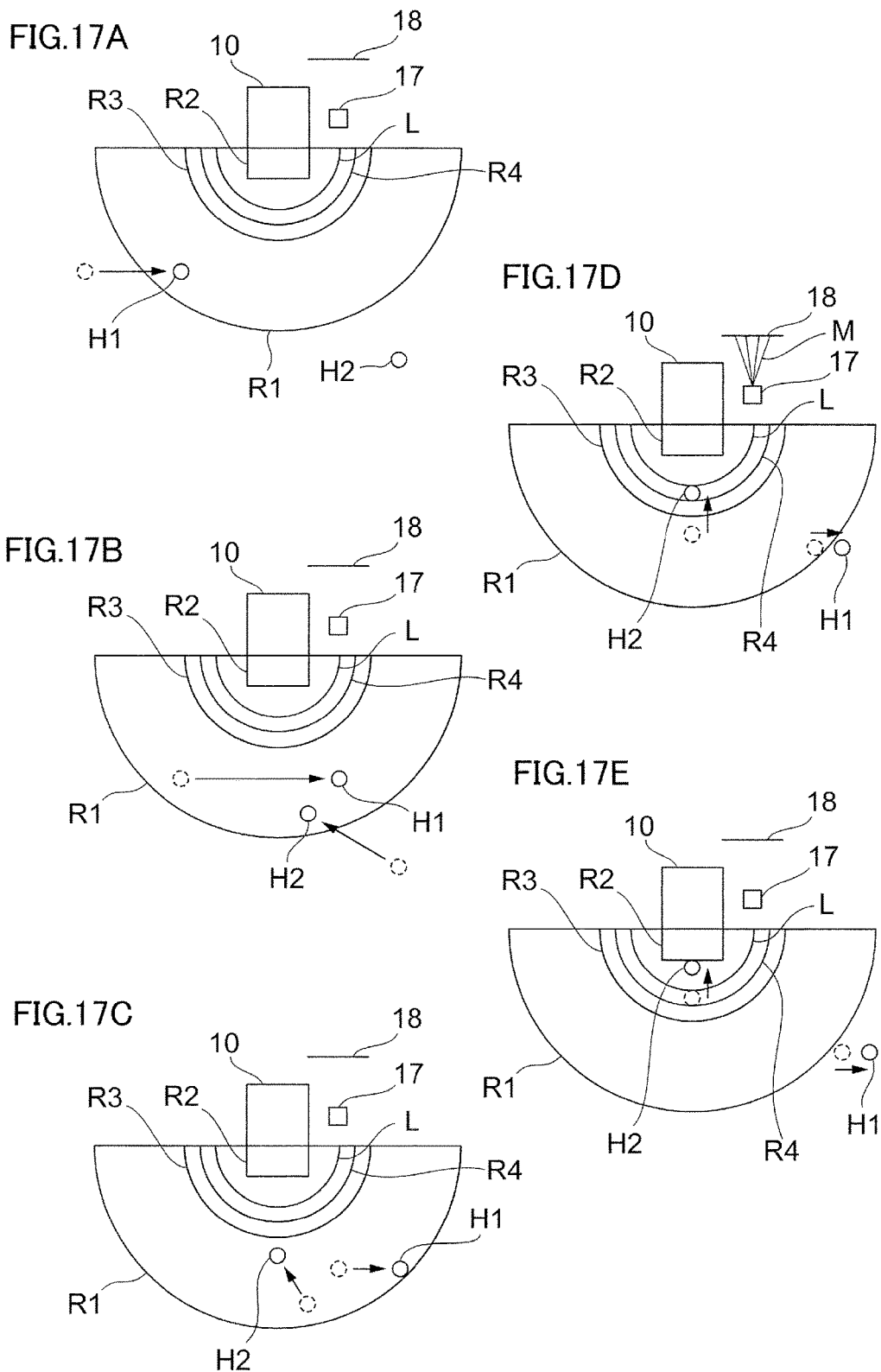

… (1)

AUTHENTICATION DEVICE AND AUTHENTICATION METHOD

CROSS REFERENCE TO RELATED APPLICATION

This application is based on and claims priority under 35 USC § 119 from Japanese Patent Application No. 2015-153704 filed Aug. 3, 2015.

BACKGROUND

Technical Field

The present invention relates to an authentication device and authentication method.

Related Art

Recently, image forming apparatuses with a function of performing authentication of a user by facial information have been suggested.

SUMMARY

According to an aspect of the present invention, an authentication device includes: an image capturing unit that captures an image of a person around an apparatus including the authentication device; an authentication unit that performs authentication by a facial image captured by the image capturing unit; and a selection unit, when the image capturing unit captures facial images of plural persons, that selects a facial image of a person who is determined to have a high possibility of using the apparatus from the facial images of the plural persons.

BRIEF DESCRIPTION OF THE DRAWINGS

Exemplary embodiments of the present invention will be described in detail based on the following figures, wherein:

FIG. 10A is a diagram showing an example of a registration table registered on the image forming apparatus in advance by a user, and FIG. 10B is a diagram showing an example of a tracking table used in the face detection and facial image obtaining process;

FIGS. 11A to 11E are diagrams showing a first example of temporal changes in positions of persons existing around the image forming apparatus;

FIGS. 15A to 15D are diagrams showing a second example of temporal changes in positions of persons around the image forming apparatus;

FIGS. 16A to 16E are diagrams showing a third example of temporal changes in positions of persons around the image forming apparatus; and FIGS. 17A to 17E are diagrams showing a forth example of temporal changes in positions of persons around the image forming apparatus.

DETAILED DESCRIPTION

Hereinafter, an exemplary embodiment according to the present invention will be described in detail with reference to attached drawings.

Figure 1:
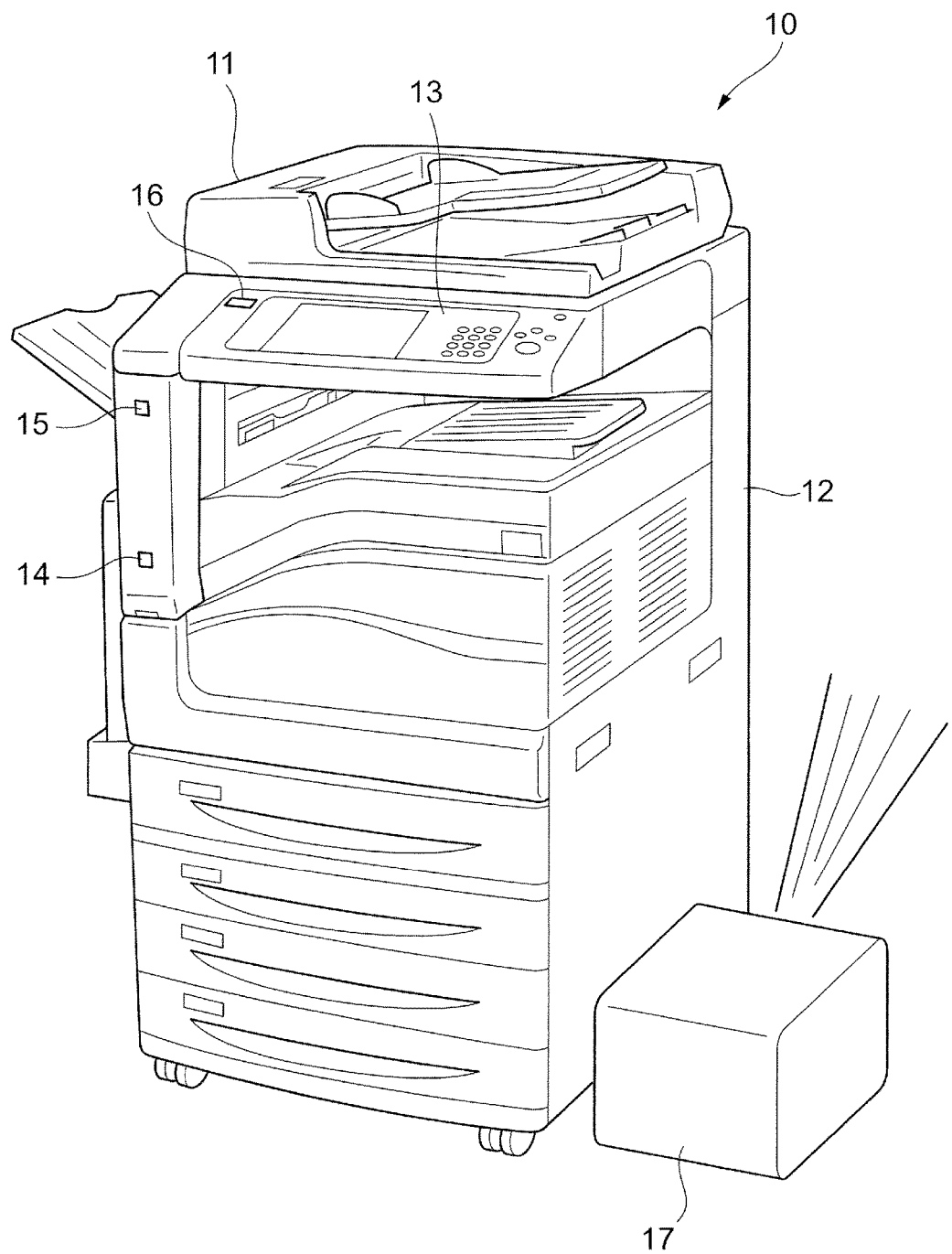
FIG. 1 is a perspective view of an image forming apparatus to which an exemplary embodiment is applied.

FIG. 1 is a perspective view of an image forming apparatus to which the exemplary embodiment is applied. The image forming apparatus 10, as an example of an authentication device, a processing device and a display, is a so-called multifunction machine including, for example, a scanning function, a printing function, a copying function and a facsimile function.

The image forming apparatus 10 includes a scanner 11, a printer 12 and a user interface (UI) 13. The scanner 11 is a device for reading an image formed on an original, and the printer 12 is a device for forming an image on a recording material. Moreover, the user interface 13 is a device for, when a user uses the image forming apparatus 10, accepting operations (instructions) by the user and displaying various kinds of information to the user.

The scanner 11 of the exemplary embodiment is arranged on an upper side of the printer 12. Moreover, the user interface 13 is attached to the scanner 11. Here, the user interface 13 is arranged on the front side of the image forming apparatus 10 (the scanner 11) where a user stands when he/she uses the image forming apparatus 10. Then, the user interface 13 is arranged to face upward so as to allow the user standing on the front side of the image forming apparatus 10 to perform operations in a state looking downward from above.

Moreover, the image forming apparatus 10 further includes a pyroelectric sensor 14, a first camera 15 and a second camera 16. The pyroelectric sensor 14 and the first camera 15 are attached on the front side and on the left side of the printer 12, to face frontward. The first camera 15 is arranged on the upper side of the pyroelectric sensor 14. Moreover, the second camera 16 is attached on the left side in the user interface 13 to face upward.

Here, the pyroelectric sensor 14 has a function of sensing movement of moving bodies (people or the like) including a user on the front side of the image forming apparatus 10. The first camera 15 is configured with a so-called video camera, and has a function of capturing an image on the front side of the image forming apparatus 10. Further, the second camera 16 is also configured with a so-called video camera, and has a function of capturing an image on the upper side of the image forming apparatus 10. Here, a fish-eye lens is attached to each of the first camera 15 and the second camera 16. This allows the first camera 15 and the second camera 16 to be capable of capturing an image of wider angle as compared to a case where a common lens is used.

Further, the image forming apparatus 10 includes a projector 17. In this example, the projector 17 is arranged on the right side of the main body of the image forming apparatus 10 as viewed from the front side. The projector 17 projects various kinds of images onto a screen not shown) provided behind the image forming apparatus 10. Here, the screen is not limited to a so-called movie screen, and a wall or the like may be used. Note that it is possible to change the placement position of the projector 17 with respect to the main body of the image forming apparatus 10. Moreover, in this example, the main body of the image forming apparatus 10 and the projector 17 are separately provided; however, the main body of the image forming apparatus 10 and the projector 17 may be integrated by adopting a technique, for example, to attach the projector 17 on the back side of the scanner 11.

Figure 2:
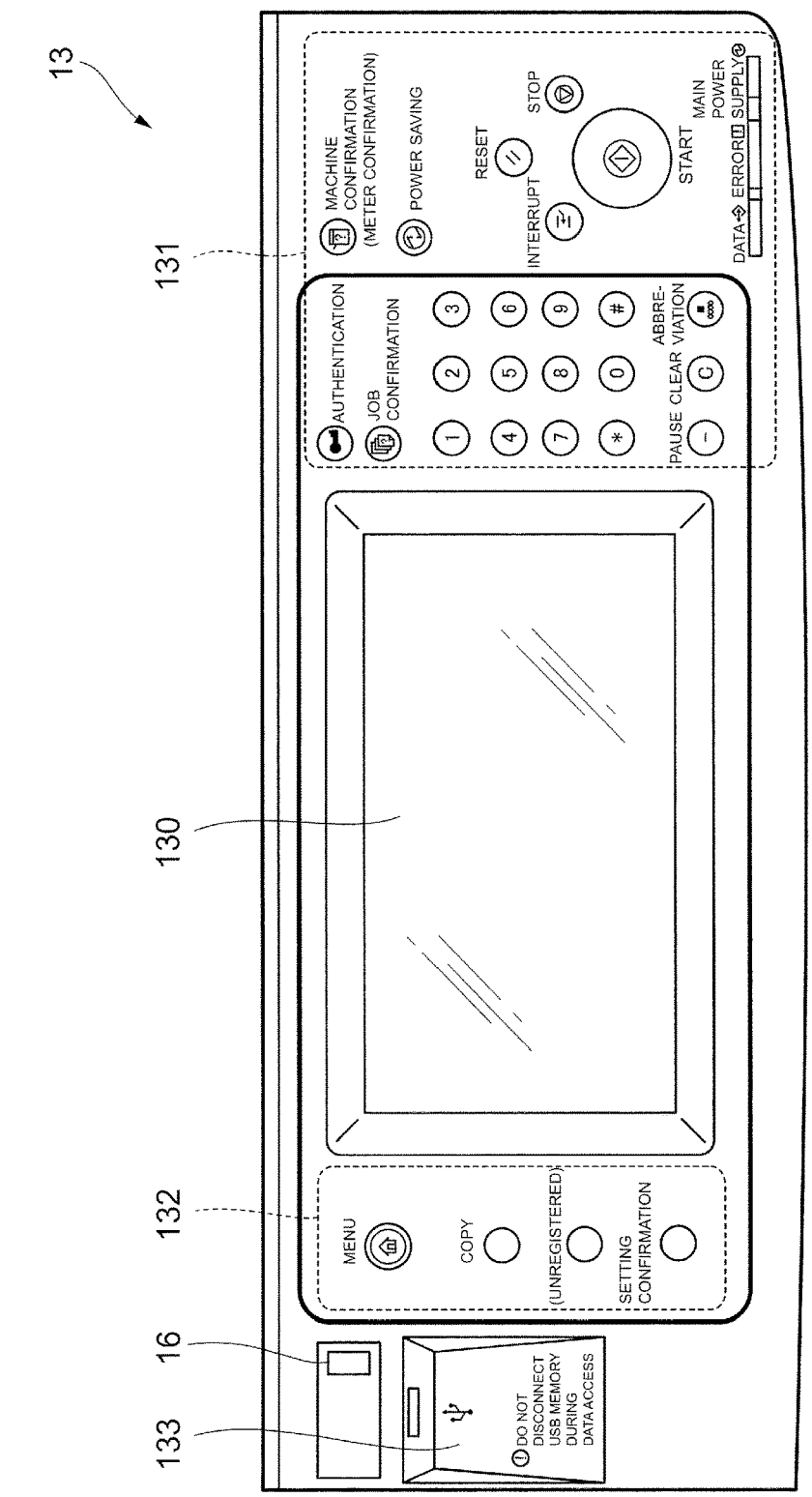
FIG. 2 is a top view of a user interface.

FIG. 2 is a top view of the user interface 13 shown in FIG. 1. However, FIG. 2 also shows the second camera 16 arranged in the user interface 13 together.

The user interface 13 includes a touch panel 130, a first operation-group 131, a second operation-button group 132 and a USB memory attachment portion 133. Here, the first operation-button group 131 is arranged on the right side of the touch panel 130. The second operation-button group 132, the USB attachment portion 133 and the second camera 16 are arranged on the left side of the touch panel 130.

Here, the touch panel 130 has a function of displaying information using an image to a user, and accepting an input from the user. Moreover, the first operation-button group 131 and the second operation-button group 132 have a function of accepting an input from a user. Further, the USB memory attachment portion 133 has a function of accepting attachment of a USB memory by a user.

Moreover, the second camera 16 that is attached to the user interface 13 is arranged at a position capable of capturing an image of a face of a user who uses the image forming apparatus 10. The image captured by the second camera 16 (including an image of a user's face) is displayed on the touch panel 130. Here, in the image forming apparatus 10 of the exemplary embodiment, as will be described later, authentication for authorizing the use of the image forming apparatus 10 is carried out by use of a facial image obtained by capturing a face of a person who is approaching the image forming apparatus 10 by the first camera 15. Consequently, a person who is going to use the image forming apparatus 10 (a user) is required to register a facial image in advance. The second camera 16 in the exemplary embodiment is used for capturing a person's face in registration of such a facial image.

Moreover, in the exemplary embodiment, it is also possible to display an image captured by the first camera 15 on the touch panel 130. Note that, in the following description, the image captured by the first camera 15 is referred to as a first camera image, and the image captured by the second camera 16 is referred to as a second camera image.

Figure 3:
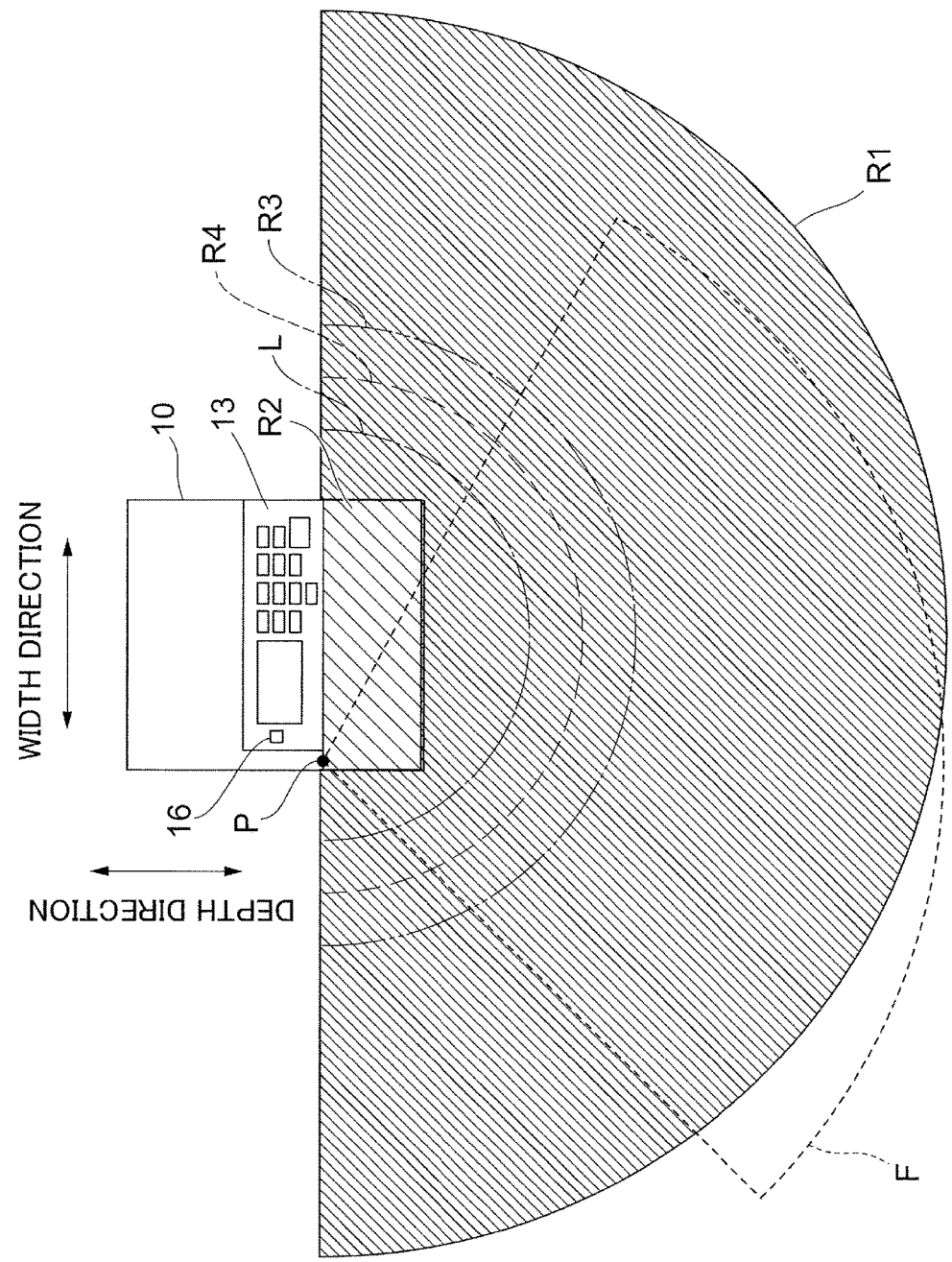
FIG. 3 is a top view for illustrating a range in which human existence is sensed by the image forming apparatus.

FIG. 3 is a top view for illustrating a range in which human existence is sensed by the image forming apparatus 10. FIG. 3 shows the image forming apparatus 10 and the periphery thereof as viewed from an upper side in the height direction of the image forming apparatus 10.

Figure 4:
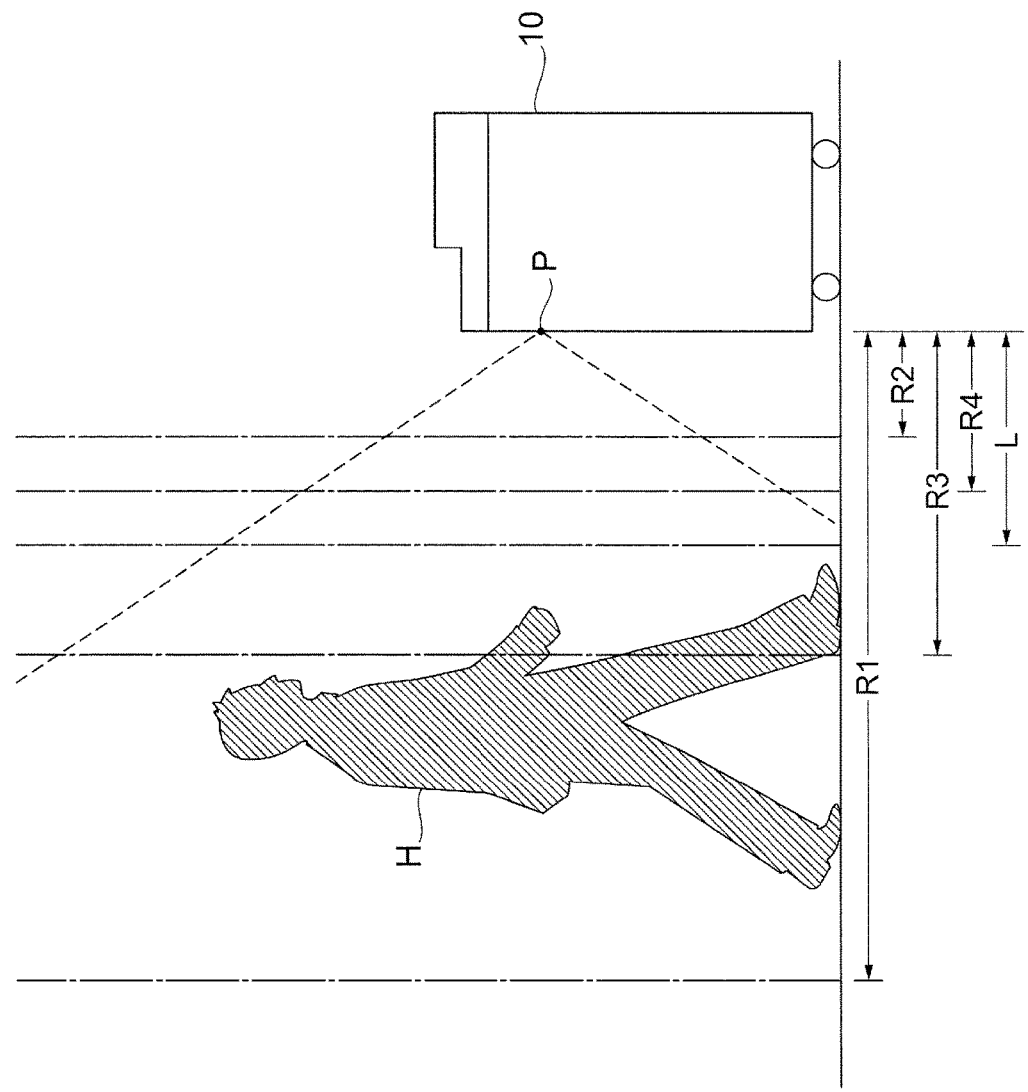
FIG. 4 is a side view for illustrating the range in which human existence is sensed by the image forming apparatus.

Moreover, FIG. 4 is a side view for illustrating a range in which human existence is sensed by the image forming apparatus 10. FIG. 4 shows the image forming apparatus 10 and the periphery thereof as viewed from a lateral side (in this example, the right side as viewed from the front side of the image forming apparatus 10). Note that, in FIG. 4, a person H is shown together; however, in the detection range F shown in FIG. 3, illustration of the person H is omitted.

Here, as shown in FIGS. 3 and 4, a portion where the first camera 15 (refer to FIG. 1) is attached in the image forming apparatus 10 is referred to as a position P of the image forming apparatus 10.

In this example, the pyroelectric sensor 14 (refer to FIG. 1) senses a person H existing within the detection range F. The detection range F is formed on the front side of the image forming apparatus 10, and shows a sector shape with a center angle being set to less than 180 degrees as viewed from an upper side in the height direction.

Moreover, in this example, by use of results of analyzing the first camera images captured by the first camera 15 (refer to FIG. 1), persons H existing within a human sensing range R1, a human operation range R2, an entry sensing range R3 and an approach sensing range R4.

Of these, the human sensing range R1 is formed on the front side of the image forming apparatus 10, and shows a sector shape with a center angle being set to 180 degrees as viewed from an upper side in the height direction. The human sensing range R1 is set to include an entire detection range F (however, in this example, a part thereof is not included). Note that the center angle of the human sensing range R1 may be other than 180 degrees. However, the first camera 15 sets at least the entire human sensing range R1 as an image capturing range.

The human operation range R2 is set on the front side of the image forming apparatus 10, and shows a rectangular shape as viewed from an upper side in the height direction. In this example, the length in the width direction in this rectangular range is the same as the length of the image forming apparatus 10 in the width direction. Moreover, an entire region of the human operation range R2 is positioned inside the human sensing range R1. Further, the human operation range R2 is arranged closer to the image forming apparatus 10 in the human sensing range R1.

Further, the entry sensing range R3 is formed on the front side of the image forming apparatus 10, and shows a sector shape with a center angle being set to 180 degrees as viewed from an upper side in the height direction. Moreover, an entire region of the entry sensing range R3 is positioned inside the human sensing range R1. Further, the entry sensing range R3 is arranged closer to the image forming apparatus 10 in the human sensing range R1. Moreover, an entire region of the human operation range R2 as described above is positioned inside the entry sensing range R3. Further, the human operation range R2 is arranged closer to the image forming apparatus 10 in the entry sensing range R3.

Then, the approach sensing range R4 is formed on the front side of the image forming apparatus 10, and shows a sector shape with a center angle being set to 180 degrees as viewed from an upper side in the height direction. Moreover, an entire region of the approach sensing range R4 is positioned inside the entry sensing range R3. Further, the approach sensing range R4 is arranged closer to the image forming apparatus 10 in the entry sensing range R3. Moreover, an entire region of the human operation range R2 as described above is positioned inside the approach sensing range R4. Further, the human operation range R2 is arranged closer to the image forming apparatus 10 in the approach sensing range R4.

In the image forming apparatus 10 of the exemplary embodiment, as will be described later, authentication for authorizing the use of the image forming apparatus 10 is carried out by use of a facial image obtained by capturing a face of a person H who is approaching the image forming apparatus 10 by the first camera 15. Moreover, in the image forming apparatus 10, as will be described later, a tow of a person H existing within the human sensing range R1 is detected by use of the first camera image captured by the first camera 15, and it is determined whether or not the person H is heading for the image forming apparatus 10.

Here, since the height of the image forming apparatus 10 is usually set to in the vicinity of 1000 mm to 1300 mm in consideration of ease of use, the height of the first camera 15 is in the vicinity of 700 mm to 900 mm from an installation surface. Moreover, as described above, since it is required to capture an image of a tow of a person H by use of the first camera 15, the height of the first camera 15 is limited to a low position to some extent. For such reasons, the height of the first camera 15 from the installation surface (the position P) is, as shown in FIG. 4, lower than the height of a face of an ordinary adult (a person H). Consequently, if the person H comes too close to the image forming apparatus 10, it becomes difficult to capture an image of a face of the person H by the first camera 15 even though the fish-eye lens is used, and in addition, even if an image of the face of the person H could be captured, it becomes difficult to analyze the obtained facial image.

Accordingly, in this example, a limit of a distance in which analysis of a facial image of a person H is possible by analyzing the first camera image captured by the first camera 15 is determined as a facial sensing limit L. The facial sensing limit L is determined based on a distance capable of capturing an image of a face of a person H of ordinary height by the first camera 15. In this example, the facial sensing limit L is positioned outside of the human operation range R2 and inside the approach sensing range R4.

If there is a person H who is going to use the image forming apparatus 10 of the exemplary embodiment, the person H first enters into the inside of the detection range F. Moreover, the person H having entered into the detection range F further enters into the human sensing range R1, and via the entry sensing range R3 and the approach sensing range R4, further enters into the human operation range R2. Note that, in this example, the person H moving in the human sensing range R1 breaks through the facial sensing limit L while entering into the human operation range R2 from the approach sensing range R4. Then, the person H having entered into the human operation range R2 is to perform operations or the like by use of the user interface 13 while staying within the human operation range R2. Note that it is unnecessary to set each of the human sensing range R1, the human operation range R2, the entry sensing range R3 and the approach sensing range R4 strictly as shown in FIG. 3; however, it is sufficient to be accurate to identify the person H based on the first camera image captured by the first camera 15. In addition, it is unnecessary to set the facial sensing limit L between the human operation range R2 and the approach sensing range R4, and the position of the facial sensing limit L may be changed in accordance with performance or an attachment position (the height of the position P from the installation surface) of the first camera 15 or the like.

Figure 5:
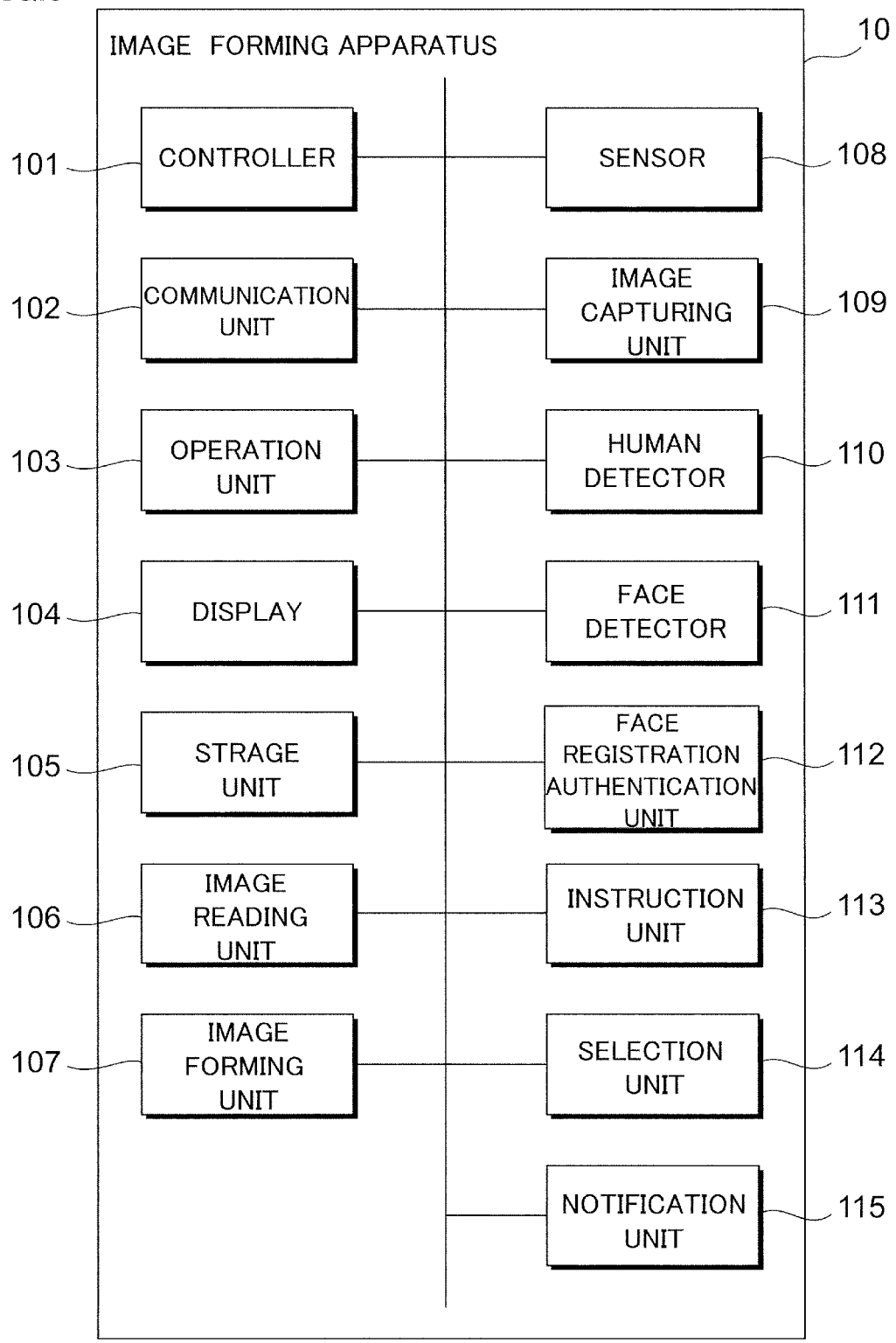
FIG. 5 is a functional block diagram of the image forming apparatus.

FIG. 5 is a functional block diagram of the image forming apparatus 10. The image forming apparatus 10 of the exemplary embodiment includes a controller 101, a communication unit 102, an operation unit 103, a display 104, a storage unit 105, an image reading unit 106 and an image forming unit 107. Moreover, the image forming apparatus 10 further includes a sensor 108, an image capturing unit 109, a human detector 110, a face detector 111, a face registration authentication unit 112, an instruction unit 113, a selection unit 114 and a notification unit 115.

The controller 101 includes, for example, a CPU (Central Processing Unit) and a memory, to control each component of the image forming apparatus 10. The CPU executes programs stored in the memory or the storage unit 105. The memory includes, for example, ROM (Read Only Memory) and RAM (Random Access Memory). ROM stores programs or data in advance. RAM temporarily stores programs or data, and is used as a working area when the CPU executes some programs.

The communication unit 102 is a communication interface connected to not-shown communication lines. The communication unit 102 carries out communication with client devices or other image forming apparatuses (both not shown in the figure) via the communication lines.

The operation unit 103 inputs information according to operations of a user to the controller 101. In this example, the operation unit 103 is realized by the touch panel 130, the first operation-button group 131 and the second operation-button group 132 provided to the user interface 13.

The display 104 displays various kinds of information to the user. In this example, the display unit 104 is realized by the touch panel 130 provided to the user interface 13.

The storage unit 105 is, for example, a hard disk, and stores various kinds of programs or data used by the controller 101.

The image reading unit. 106 reads an image of an original, to thereby create image data. In this example, the image reading unit 106 is realized by the scanner 11.

The image forming unit 107 forms an image corresponding to image data onto a sheet-like recording material, such as a paper sheet. In this example, the image forming unit 107 is realized by the printer 12. Note that the image forming unit 107 may form the age by an electrophotographic system or another system.

The sensor 108 senses the moving bodies including a person H. In this example, the sensor 108 is realized by the pyroelectric sensor 14.

The image capturing unit 109 captures an image of an imaging object including a person H. In this example, the image capturing unit 109 is realized by the first camera 15 and the second camera 16.

The human detector 110 analyzes the first camera images captured by the first camera 15, to thereby detect a person H existing within the human sensing range R1, the human operation range R2, the entry sensing range R3 and the approach sensing range R4.

The face detector 111 analyzes the first camera images captured by the first camera 15, to thereby detect a facial image of a person H existing inside the human sensing range R1 and outside the face sensing limit L.

With respect to a person H who is able to use the image forming apparatus 10 (a user), the face registration authentication unit 112 performs registration of the user by use of a facial image of the user in advance. Here, in the registration, imaging of a facial image of the user by use of the second camera 16 and extraction of a feature amount from the facial image obtained by imaging are carried out. An ID of the user (a registration ID), various kinds of information set by the user (referred to as registered person information) and, the feature amount extracted from the facial image of the user (referred to as facial information) are associated with one another and stored in the storage unit 105. Note that, in the following description, an item associating the registration ID, the registered person information and the facial information is referred to as a registration table, and the user (the person H) registered to the registration table is referred to as a registered person.

Moreover, when the user is going to use the image forming apparatus 10, the face registration authentication unit 112 carries out authentication using the facial image of the user. Here, in the authentication, imaging of a facial image of the person H (the user) by use of the first camera 15 and extraction of a feature amount from the facial image obtained by imaging are carried out. Then, it is examined whether or not the feature amount obtained by imaging of this time coincides with a feature amount having been already registered, and in a case where there is any coincidence (in a case where the person H is a registered person who has been registered as a user), use of the image forming apparatus 10 is authorized; however, in a case where there is no coincidence (in a case where the person H is unregistered person who has not been registered as a user), use of the image forming apparatus 10 is prohibited.

The instruction unit 113 outputs an instruction to start authentication using the facial image captured by use of the first camera 15 to the face registration authentication unit 112.

In a case where plural facial images of the same person H have been obtained by use of the first camera 15, the selection unit 114 selects one from the plural facial images.

The notification unit 115 notifies, for example, the person H existing inside the human sensing range R1 of information to be known as necessary. The notification unit 115 is realized by the projector 17.

In the exemplary embodiment, the image capturing unit 109 (more specifically, the first camera 15) is an example of an image capturing unit, the face registration authentication unit 112 is an example of an authentication unit, and the storage unit 105 is an example of a retaining unit. Moreover, the face detector 111 and the face registration authentication unit 112 are an example of an identifying unit, and the face registration authentication unit 112 is an example of a processing unit. Further, a region of the human sensing range R1, which is inside the face sensing limit L (the side closer to the image forming apparatus 10), is an example of a set range, and a human sensing range R1 is an example of a first region. Still further, the entry sensing range R3 is an example of a second region, and a region of the human sensing range R1, which is outside the face sensing limit L, is an example of a third region.

Here, the image forming apparatus 10 of the exemplary embodiment is operated in accordance with any of two modes, namely, "normal mode" and "sleep mode", which are different in power consumption. When the image forming apparatus 10 is operated in the normal mode, power required to execute various kinds of processing is supplied to each component of the image forming apparatus 10. On the other hand, when the image forming apparatus 10 is operated in the sleep mode, power supply to at least part of the image forming apparatus 10 is stopped, and thereby, power consumption of the image forming apparatus 10 is reduced as compared to power consumption in the normal mode. However, even when the image forming apparatus 10 is operated in the sleep mode, power supply to the controller 101, the pyroelectric sensor 14 and the first camera 15 is performed, and accordingly, each of these components can also be operated in the sleep mode.

Figure 6:
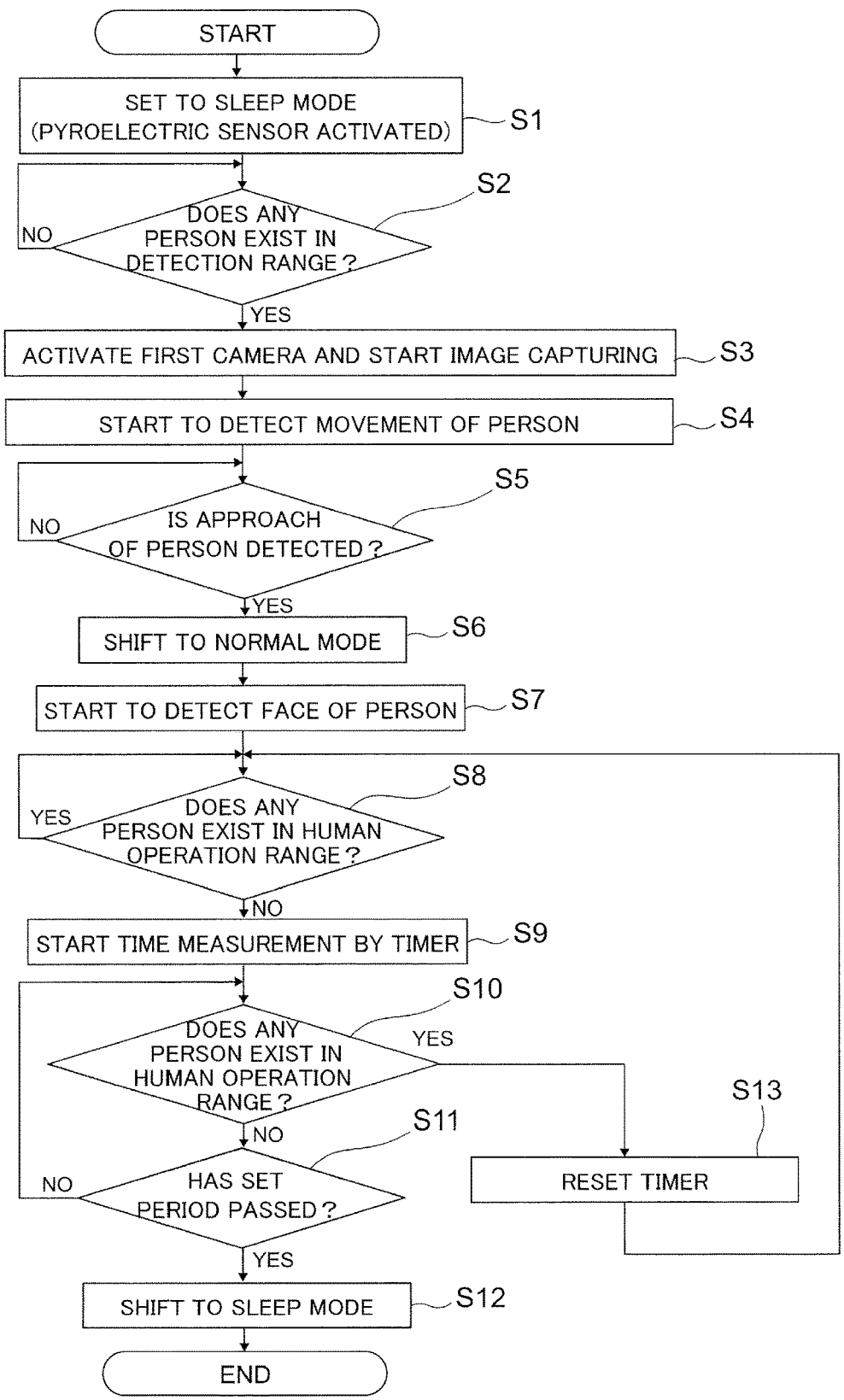
FIG. 6 is a flowchart for illustrating a flow of a process related to mode control of the image forming apparatus.

FIG. 6 is a flowchart for illustrating a flow of a process related to mode control of the image forming apparatus 10.

In this example, in an initial state, the image forming apparatus 10 is set to the sleep mode (step 1). Note that, even in the sleep mode, the pyroelectric sensor 14 is activated and operated. On the other hand, it is assumed that the first camera 15 is not activated at this time. When the image forming apparatus 10 is operated in the sleep mode, the controller 101 monitors the detection result of an amount of infrared rays by the pyroelectric sensor 14, and determines whether or not there exists a person H in the detection range F (step 2). If negative determination (NO) is made in step 2, the process is returned to step 2 and the processing is repeated.

On the other hand, in a case where positive determination (YES) is made in step 2, that is, in a case where a person H is sensed within the detection range F, the controller 101 starts power supply to the first camera 15 and activates the first camera 15 to start to capture an image of the human sensing range R1 (step 3). When image capturing by the first camera 15 is started, the human detector 110 analyzes the first camera images obtained from the first camera 15, to thereby start processing for detecting movement of the person H (step 4).

In the processing for detecting movement of the person H, which is started in step 4, the human detector 110 estimates the distance from the image forming apparatus 10 to the person H and calculates a motion vector indicating the movement of the person H. The processing for detecting movement of the person H may be carried out by a known method; for example, the human detector 110 estimates the distance from the image forming apparatus 10 to the person H based on sizes of body parts detected from the captured image. Moreover, the human detector 110 carries out frame processing on the captured image by the first camera 15, and compares the captured images of plural frames in chronological order. On this occasion, the human detector 110 detects, for example, a tow as a body part of the person H and calculates the motion vector by analyzing movement of the detected part. Moreover, the human detector 110 corrects the first camera images (a distorted image obtained through the fish-eye lens obtained from the first camera 15 to a planar image (planar view development), and thereafter, detects the movement of the person H.

Next, the human detector 110 determines whether or not an approach of the person H existing within the human sensing range R1 to the image forming apparatus 10 is sensed (step 5). For example, if it is determined that the person H exists within the human sensing range R1 and moves toward the image forming apparatus 10, the human detector 110 makes positive determination (YES) in step 5. If negative determination (NO) is made in step 5, the process is returned to step 5 and the processing is repeated.

In contrast thereto, if positive determination (YES) is made in step 5, the controller 101 shifts the mode of the image forming apparatus 10 from the sleep mode to the normal mode (step 6). On that occasion, the controller 101 provides instructions so that power supply corresponding to the normal mode is carried out for each component of the image forming apparatus 10, and activates each component of the image forming apparatus 10. At this time, the controller 101 starts power supply to the second camera 16 and activates the second camera 16.

In the exemplary embodiment, immediate shift from the sleep mode to the normal mode is not carried out with sensing existence of the person H within the human sensing range R1 as a trigger; however, shift from the sleep mode to the normal mode is carried out with sensing approach of the person H existing within the human sensing range R1 to the image forming apparatus 10 as a trigger. By executing such a control, for example, in a case where the person H merely passes through the human sensing range R1, opportunities of unnecessary shifting of the image forming apparatus 10 from the sleep mode to the normal mode are reduced.

Moreover, with the shift from the sleep mode to the normal mode in step 6, the human detector 111 analyzes the first camera images obtained from the first camera 15, to thereby start processing for detecting a face of the person H existing within the human sensing range R1 (step 7).

Subsequently, the human detector 110 analyzes the first camera images obtained from the first camera 15, to thereby determine whether or not the person H exists (stays) within the human operation range R2 (step 8). At this time, the human detector 110 analyzes the first camera images by the first camera 15 to detect body parts of the person H, and senses the existence of the person H within the human operation range R2 based on positions and sizes of the detected parts. For example, the human detector 110 estimates the distance from the image forming apparatus 10 to the person H based on the sizes of the detected body parts, and identifies the direction in which the person H exists based on the positions of the detected body parts.

In a case where positive determination (YES) is made in step 8, the process returns to step 8, to thereby continue the processing for detecting a face of the person H, which has been started in step 7. Consequently, the human detector 110 repeats the processing for detecting the existence of the person H within the human operation range R2, while staying in the normal mode, until the existence of the person H in the human operation range R2 is not sensed.

On the other hand, in a case where negative determination (NO) is made in step 8, that is, in a case where the person H does not exist in the human operation range R2 (the person H exits from the human operation range R2), the controller 101 starts time measuring by a timer step 9). In other words, the controller 101 measures elapsed time since the person H does not exist in the human operation range R2 by the timer.

Next, the human detector 110 determines whether or not the person H exists within the human operation range R2 (step 10). In step 10, the human detector 110 determines, after the person H does not exist in the human operation range R2, whether or not the person H exists again within the human operation range R2.

In a case where negative determination (NO) is made in step 10, the controller 101 determines whether or not the time measured by the timer exceeds a set period of time (step 11). The set period of time is, for example, one minute; however, the set period of time may be set to a time other than one minute. If negative determination (NO) is made in step 11, the controller 101 returns to step 10 and continues the processing. In other words, in steps 10 and 11, it is determined whether or not a time period in which the person H does not exist in the human operation range R2 continues for the set period of time.

In contrast thereto, if positive determination (YES) is made in step 11, the controller 101 shifts the mode of the image forming apparatus 10 from the normal mode to the sleep mode (step 12). On that occasion, the controller 101 provides instructions to carry out power supply of the sleep mode to each component of the image forming apparatus 10, and stops operations of each part of the image forming apparatus 10, which is to be stopped in the sleep mode. Thereafter, when the pyroelectric sensor 14 does not sense the existence of the person H within the detection range F, the controller 101 stops the operation of the first camera 15.

Here, consideration will be given of a case in which, after the time measurement by the timer is started in step 9, existence of the person H in the human operation range R2 is detected again before the set period of time passes since the person H does not exist in the human operation range R2.

In this case, the controller 101 makes positive determination (YES) in step 10 and stops the time measurement by the timer and resets the timer (step 13). Then, the controller 101 returns to step 8 and continues the processing. In other words, the processing in the case where the person H exists in the human operation range R2 is carried out again. Note that the case in which the person H, who is one and the same person, returns to the inside of the human operation range R2 is taken as an example here; however, even in a case where a person H, who is a different person, moves into the human operation range R2, the human detector 110 also makes positive determination (YES) in step 10.

Here, conventionally, in a case where a person H, who is going to use the image forming apparatus 10 (a user), carries out authentication using the facial image of himself/herself, the user provides an instruction to capture the facial image and request for authentication by himself/herself. For example, the person H stands in the human operation range R2, and in a state causing his/her face to face the second camera 16 provided in the user interface 13, the facial image is captured. In contrast thereto, in the image forming apparatus 10 of the exemplary embodiment, the facial image of the person H existing in the human sensing range R1 is captured by the first camera 15 in advance, and then, in a state satisfying specific conditions, authentication is carried out by use of the facial image of the person H having already been captured.

Figure 7:
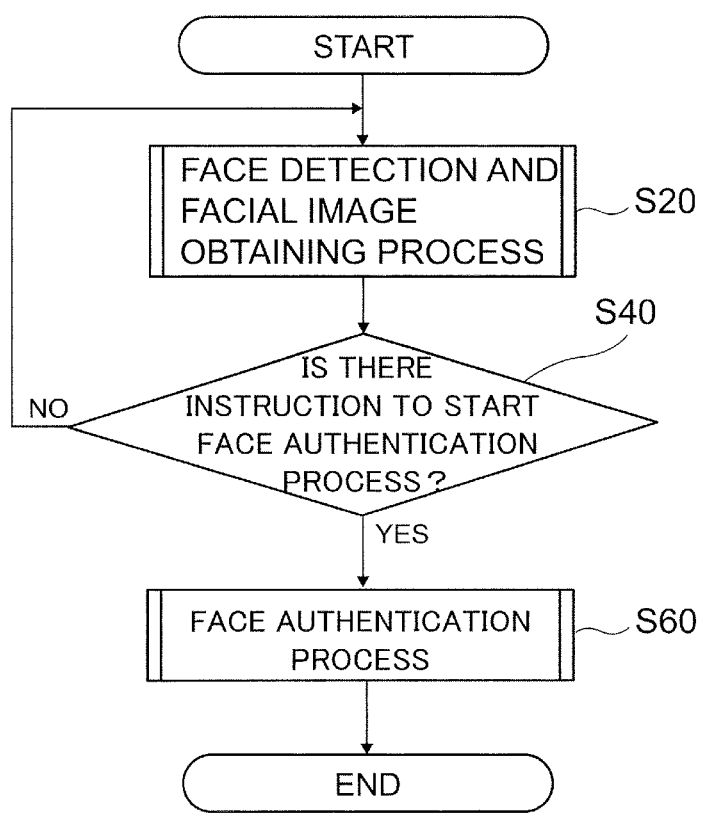
FIG. 7 is a flowchart for illustrating a flow of authentication procedures in the image forming apparatus.

FIG. 7 is a flowchart for illustrating a flow of authentication procedures in the image forming apparatus 10. Note that the processing shown in FIG. 7 is carried out in a state in which the image forming apparatus 10 is set to the normal mode.

With the image forming apparatus 10 being set to the normal mode, as shown in step 7 in FIG. 6, the first camera images obtained from the first camera 15 is analyzed, to thereby start the processing for detecting the face of the person H existing in the human sensing range R1. With this, the face detector 111 carries out the face detection and facial image obtaining process that detects the face of the person H from the first camera images and obtains the detected facial image (step 20). Moreover, the face registration authentication unit 112 determines whether or not there is any instruction from the instruction unit 113 to start the face authentication process (step 40). If negative determination (NO) is made in step 40, the process is returned to step 20 and the processing is continued.

On the other hand, if positive determination (YES) is made in step 40, the face registration authentication unit 112 carries out the face authentication process for setting the affirmative or negative in the authentication by use of the results of the face detection and facial image obtaining process in step 20, namely, the facial image of the person H obtained from the first camera images by the first camera 15 (step 60), and completes the processing.

Note that, in FIG. 7, it seems that step 40 is carried out after execution of step 20; however, actually, step 20 and step 40 are carried out in parallel. Consequently, if positive determination (YES) is made in step 40, that is, there is an instruction to start the face authentication process during execution of processing in step 20, the processing in step 20 is interrupted and process is shifted to step 60.

Then, detailed description will be further given of each of the above described face detection and facial image obtaining process in step 20 and face authentication process in step 60.

Figure 8:
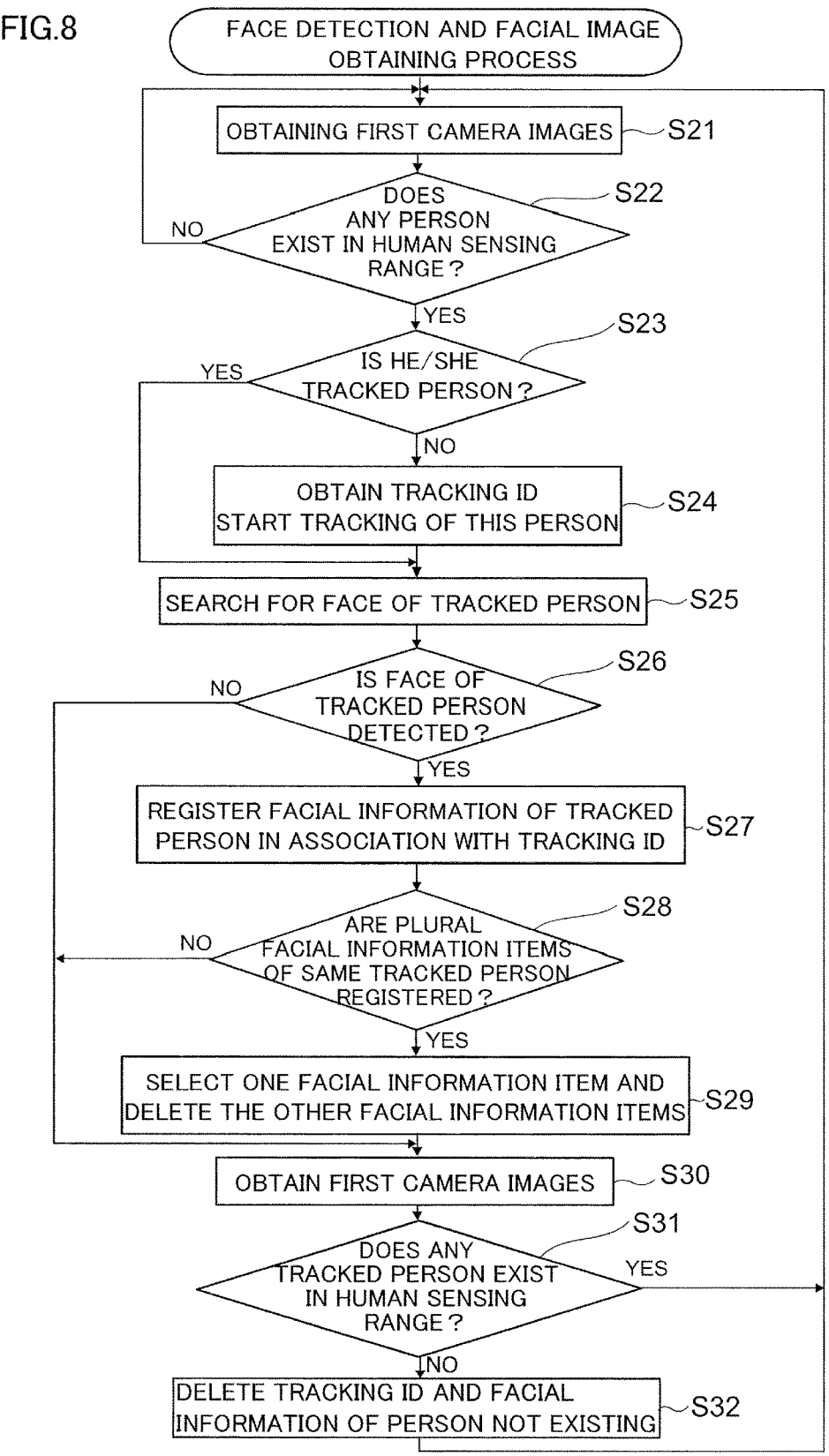
FIG. 8 is a flowchart for illustrating a flow of a face detection and facial image obtaining process in the authentication procedures.
Figure 9:
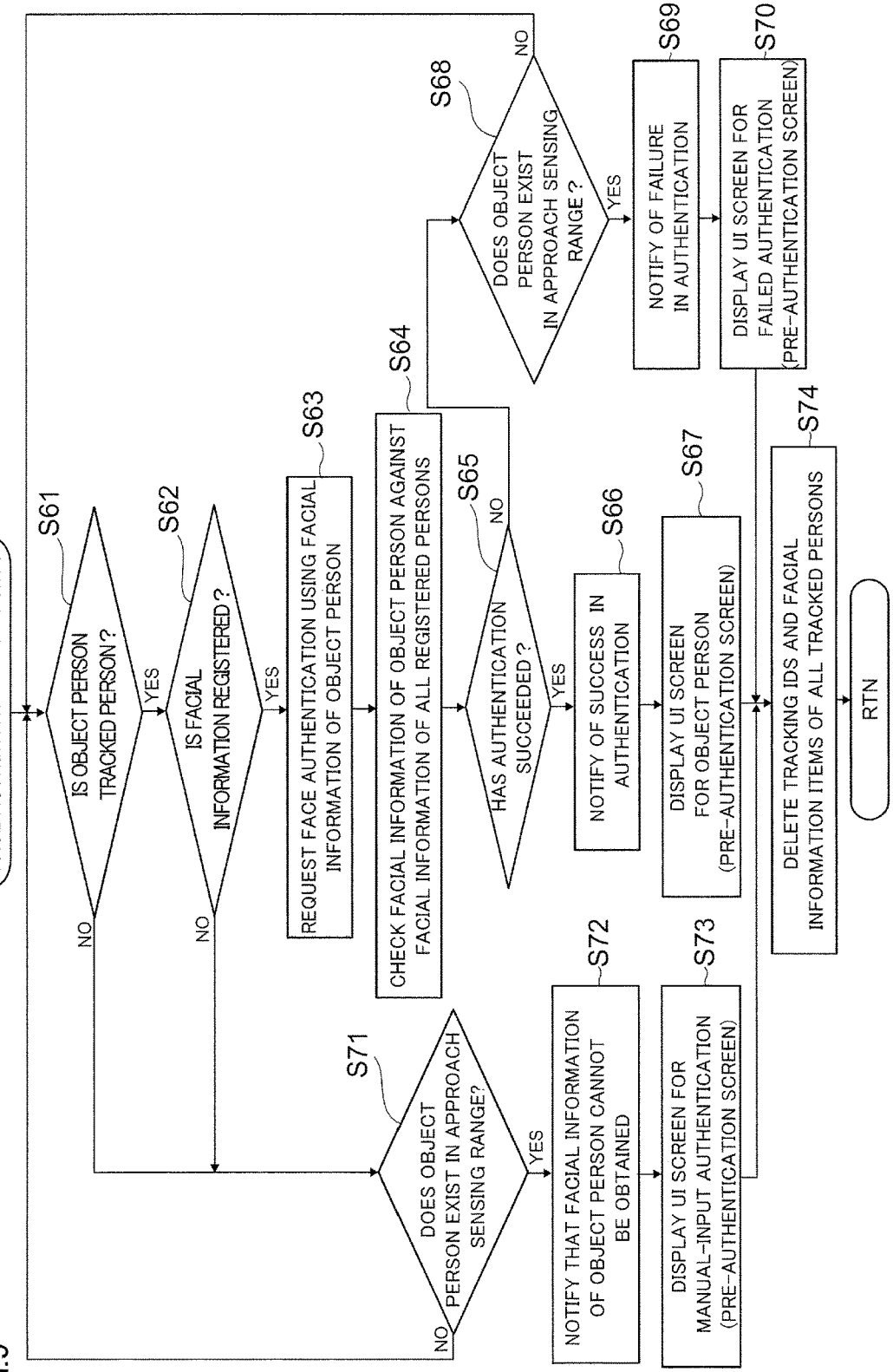
FIG. 9 is a flowchart for illustrating a flow of a face authentication process in the authentication procedures.

FIG. 8 is a flowchart for illustrating a flow of the face detection and facial image obtaining process (step 20) in the authentication procedures of the exemplary embodiment. Moreover, FIG. 9 is a flowchart for illustrating a flow of the face authentication process step 60) in the authentication procedures of the exemplary embodiment.

First, with reference to FIG. 8, description will be given of details of the face detection and facial image obtaining process in step 20.

Here, initially, the human detector 110 and the face detector 111 obtain the first camera images captured by the first camera 15 (step 21). Subsequently, the human detector 110 analyzes the first camera images obtained in step 21, to thereby determine whether or not the person H exists within the human sensing range R1 (step 22). If negative determination (NO) is made in step 22, the process is returned to step 21 and the processing is con firmed.

On the other hand, if positive determination (YES) is made in step 22, the human detector 110 determines whether or not the person H whose existence is detected in step 22 is a tracked person whose existence has already been sensed and who has been tracked (step 23). If positive determination (YES) is made in step 23, the process proceeds to later-described step 25.

In contrast thereto, if negative determination (NO) is made in step 23, the human detector 110 obtains a tracking ID of the person H whose existence has been detected in step 22 and stores the ID in the storage unit 105, and then starts tracking of the person H (step 24). Then, the face detector 111 analyzes the first camera images obtained in step 21 and makes a search for a face of the tracked person (step 25).

Next, the face detector 111 determines whether or not the face of the tracked person can be detected from the first camera images (step 26). If negative determination (NO) is made in step 26, the process proceeds to later-described step 30.

On the other hand, if positive determination (YES) is made in step 26, the face detector 111 registers facial information extracted from the facial image of the tracked person to the storage unit 105 in association with the tracking ID of the tracked person (step 27). Note that, in the following description, an item associating the tracking ID and the facial information is referred to as a tracking table. Then, the face detector 111 determines, with respect to the tracked person, whether or not plural items (in this example, two) of facial information of the same tracked person are registered in the tracking table (step 28). If negative determination (NO) is made in step 28, the process proceeds to later-described step 30.

In contrast thereto, if positive determination (YES) is made in step 28, the selection unit 114 selects one of the items of facial information, of the two items of facial information related to the same tracked person registered as the tracking table in the storage unit 105, and deletes the other item of the facial information that has not been selected from the storage unit 105 (step 29).

After that, the human detector 110 obtains the first camera images captured by the first camera 15 (step 30). Next, the human detector 110 analyzes the first camera images obtained in step 30, to thereby determine whether or not the tracked person exists within the human sensing range R1 (step 31). If positive determination (YES) is made in step 31, the process is returned to step 21 and the processing is continued.

On the other hand, if negative determination (NO) is made in step 31, the human detector 110 deletes the tracking ID and the facial information of the tracked person (the person H) whose existence is not detected in step 31 from the tracking table (step 32), and the process returns to step 21 to continue the processing.

Subsequently, with reference to FIG. 9, description will be given of details of the face authentication process in step 60.

Here, initially, the selection unit 114 selects a person H who becomes an object of a starting instruction of the face authentication process in step 40 shown in FIG. 7 (referred to as an object person), and the face registration authentication unit 112 determines whether or not the object person is the tracked person registered to the tracking table (step 61). If negative determination (NO) is made in step 61, the process proceeds to later-described step 71.

In contrast thereto, if positive determination (YES) is made in step 61, the face registration authentication unit 112 determines whether or not the facial information same as that of the object person is registered in the storage unit 105 (step 62). If negative determination (NO) is made in step 62, the process also proceeds to later-described step 71.

On the other hand, if positive determination (YES) is made in step 62, the face registration authentication unit 112 requests face authentication by use of the facial information of the object person, registration of which to the tracking table is confirmed in step 62 (step 63). Subsequently, the face registration authentication unit 112 checks the facial information of the object person against facial information of all of the registered persons registered to the registration table (step 64). Then, the face registration authentication unit 112 determines whether or not authentication has succeeded (step 65). Here, in step 65, positive determination (YES) is made if the facial information of the object person coincides with any of facial information of all of the registered persons, whereas, negative determination (NO) is made if the facial information of the object person does not coincide with any of facial information of all of the registered persons.

If positive determination (YES) is made in step 65, the notification unit 115 notifies the object person or the like of the success of the authentication by using the projector 17 (step 66). Moreover, the display 104 displays a UI screen for the object person, which is set for an authenticated object person (post-authentication screen) (step 67), and the process proceeds to later-described step 74.

On the other hand, if negative determination (NO) is made in step 65, the human detector 110 determines whether or not the object person exists within the approach sensing range R4 (step 68). If negative determination (NO) is made in step 68, the process is returned to step 61 and the processing is continued.

In contrast thereto, if positive determination (YES) is made in step 68, the notification unit 115 notifies the object person or the like of the failure of the authentication by using the projector 17 (step 69). Moreover, the display 104 displays a failed authentication UI screen set on failure of authentication (pre-authentication screen) (step 70), and the process proceeds to later-described step 74.

On the other hand, if negative determination (NO) is made in step 61, and if negative determination (NO) is made in step 62, the human detector 110 determines whether or not the object person exists within the approach sensing range R4 (step 71). If negative determination (NO) is made in step 71, the process is returned to step 61 and the processing is continued.

In contrast thereto, if positive determination (YES) is made in step 71, the notification unit 115 notifies the object person or the like that the facial information has not been obtained by using the projector 17 (step 72). Moreover, the display 104 displays a manual-input authentication UI screen set for authentication process by manual inputting (pre-authentication screen) (step 73), and the process proceeds to later-described step 74.

Then, the face registration authentication unit 112 deletes the tracking IDs and facial information of all of the tracked persons registered in the tracking table (step 74), to thereby complete the processing.

Next, while taking specific examples, detailed description will be further given of the exemplary embodiment.

FIG. 10A is a diagram showing an example of a registration table registered on the image forming apparatus 10 in advance by a user, and FIG. 10B is a diagram showing an example of a tracking table used in the face detection and facial image obtaining process of step 20. Note that these registration table and tracking table are stored in the storage unit 105.

Initially, the registration table shown in FIG. 10A will be described.

As described above, the registration table shown in FIG. 10A associates the registration ID assigned to a user, registered person information set by the user and facial information extracted from a facial image of the user. Moreover, of these items, the registered person information includes a user name which the user provides to himself/herself, an application name used in the UI screen for the user, an application function corresponding to the application name and a button design corresponding to the application name.

In the registration table shown in FIG. 10A, two persons H (registration IDs "R001." and "R002") are registered as users (registered persons). Note that, here, the case in which the two persons are registered as the users is taken as an example; however, the registered persons may be one or three or more.

Of these, with respect to the user with the registered ID "R001", the registered person information is registered as follows. First, "Fuji Taro" is registered as the user name, and "Simple copy", "Automatic scan", "Simple box storage", "Box operation", "Fax", "Private print (hutch output)" are registered as the application name. The application function and the button design corresponding to each application name are also registered. Further, facial information related to the user having the registered ID "R001" is also registered.

Moreover, with respect to the user with the registered ID "R002", the registered person information is registered as follows. First, "Fuji Hanako" is registered as the user name, and "Simple copy", "Automatic scan", "Simple box storage", "Private print (simple confirmation)", "Regular three copies", "Saving copy", "One-touch start print" and "Very line scan" are registered as the application name. The application function and the button design corresponding to each application name are also registered. Further, facial information related to the user having the registered ID "R002" is also registered.

Next, the tracking table shown in FIG. 10B will be described.

As described above, the tracking table shown in FIG. 10B associates the tracking ID assigned to a tracked person, who is the person H being tracked in the human sensing range R1, and facial information extracted from a facial image of the tracked person. Note that, in the face detection and facial image obtaining process of step 20, in a case where, though the tracked person is set, face detection of the tracked person is impossible, a situation possibly occurs that there exists a tracking ID in the tracking table, but there exists no facial information associated with the tracking ID.

Then, an instruction to start the face authentication process shown in step 40 of FIG. 7 will be described.

In the exemplary embodiment, the instruction unit 113 outputs an instruction to start the face authentication process in step 60 in a case where an action of a specific (one) person H, of one or more persons H existing in the human sensing range R1, that satisfies specific conditions is detected from the results of analysis of the first camera images captured by the first camera 15.

First Example

FIGS. 11A to 11E are diagrams showing a first example of temporal changes in positions of persons H existing around the image forming apparatus 10. Here, FIGS. 11A to 11 E exemplify the case where entry of any of the persons H existing in the human sensing range R1 into the entry sensing range R3 from the human sensing range R1 is utilized as the instruction to start the face authentication process in step 40.

Note that FIGS. 11A to 11E (the first example) to be described as follows and FIGS. 15A to 15D, FIGS. 16A to 16E and FIGS. 17A to 17E (the second to fourth examples) to be described later exemplify the case in which, as the persons H, there are two persons, namely, a first person H1 and a second person H2 around the image forming apparatus 10. Moreover, in FIGS. 11A to 11E to be described as follows and FIGS. 15A to 15D, FIGS. 16A to 16E and FIGS. 17A to 17E to be described later, a screen 18 on which an image by the projector 17 is projected is also shown.

FIG. 11A shows a situation in which the first person H1 enters into the human sensing range R1 from the outside of the human sensing range R1, and the second person H2 is positioned on the outside of the human sensing range R1. At this time, with respect to the first person H1, positive determination (YES) is made in step 22 and negative determination (NO) is made in step 23, and accordingly, the tracking ID is assigned to the first person H1 in step 24 to start tracking, and a search for the face of the first person H1 is carried out in step 25. Note that, at this time, since the second person H2 exists outside of the human sensing range R1, the second person H2 does not become an object of processing.

FIG. 11B shows a situation in which the first person H1 continuously exists in the human sensing range R1, and the second person H2 has entered into the human sensing range R1 from the outside of the human sensing range R1. At this time, with respect to the first person H1, negative determination (NO) is made in step 23, and accordingly, a search for the face of the first person H1 is continuously carried out. Moreover, at this time, with respect to the second person H2, positive determination (YES) is made in step 22 and negative determination (NO) is made in step 23, and accordingly, the tracking ID is assigned to the second person H2 in step 24 to start tracking, and a search for the face of the second person H2 is carried out in step 25.

FIG. 11C shows a situation in which the first person H1 continuously exists in the human sensing range R1, and the second person H2 has entered into the entry sensing range R3 from the human sensing range R1.

In the first example shown in FIGS. 11A to 11E, in the case where a specific person H (in this example, the second person H2) enters into the entry sensing range R3 from the human sensing range R1, the instruction unit 113 outputs the instruction to start the face authentication process; accordingly, positive determination (YES) is made in step 40 and thereby the face authentication process in step 60 is started.

Consequently, in this example, the selection unit 114 selects the second person H2 as the object person from the two tracked persons (the first person H1 and the second person H2).

Here, in the first example, even if, after the specific person H (in this example, the second person H2) is selected as the object person due to entry into the entry sensing range R3 from the human sensing range R1, a different person H (in this example, the first person H1) enters into the entry sensing range R3 from the human sensing range R1 in a state in which the specific person H continuously stays within the entry sensing range R3, the object person is not changed to the different person H from the specific person H.

FIG. 11D shows a situation in which the first person H1 continuously exists in the human sensing range R1, and the second person H2 is in a state before breaking through the face sensing limit L in the approach sensing range R4. In this example, before the object person (here, the second person H2) entered into the entry sensing range R3 breaks through the face sensing limit L, each processing in step 61 to step 65 is completed. Moreover, in this example, before the object person (here, the second person 112) entered into the entry sensing range R3 breaks through the face sensing limit L, notification in step 66, step 69 or step 72 is performed. With this, the projector 17 displays a message M on the screen 18. Here, in the case where positive determination (YES) is made in step 65 after positive determination (YES) is made in step 61 and step 62, the projector 17 displays a character image such as "Authentication succeeded" as a message M in step 66. Moreover, in the case where negative determination (NO) is made in step 65 after positive determination (YES) is made in step 61 and step 62, the projector 17 displays a character image such as "Authentication failed", "You are not registered as a user" or the like as a message M in step 69. Further, in the case where negative determination (NO) is made in step 61 or step 62, the projector 17 displays a character image such as "Facial image could not be obtained" in step 72.

With this configuration, in the case where the authentication has succeeded, the second person H2, who is the object person, is going to straightly approach the image forming apparatus 10. Moreover, in the case where the authentication has failed or the facial image is unavailable, the second person H2, who is the object person, knows the fact that the authentication has not succeeded before breaking through the face sensing limit L on which it becomes difficult to obtain a facial image using the first camera 15.

Note that, here, description has been given of the case in which the information "Facial information could not be obtained" is provided in step 72; however, information to be provided is not limited thereto. For example, in step 72, notification to the person H of requesting not to approach the apparatus (the image forming apparatus 10), notification of requesting not to approach the apparatus (the image forming apparatus 10) because the face authentication of the person H is not completed, notification of requesting to the person H to stop, notification of requesting to the person H to stop because the face authentication of the person H is not completed, notification of informing that part of the face of the person H is outside an image capturing range by the first camera 15, or the like may be carried out.

FIG. 11E shows a situation in which the first person H1 continuously exists in the human sensing range R1, and the second person H2 is in a state before entering into the human operation range R2 in the approach sensing range R4. In this example, the projector 17 finishes notification of the message M during the shift from the situation shown in FIG. 11D to the situation shown in FIG. 11E. Moreover, in this example, before the object person (here, the second person H2) who has entered into the entry sensing range R3 enters into the human operation range R2, the display in step 67, step 70 or step 73 is carried out.

With this configuration, in the situation in which the second person H2, who is the object person and with whom the face authentication process has been performed, enters into the human operation range R2 and stands in front of the user interface 13, the UI screen corresponding to the second person H2 has already been displayed on the touch panel 130.

Here, the UI screen displayed on the touch panel 130 in step 67, step 70 and step 73 will be described.

Figure 12A:
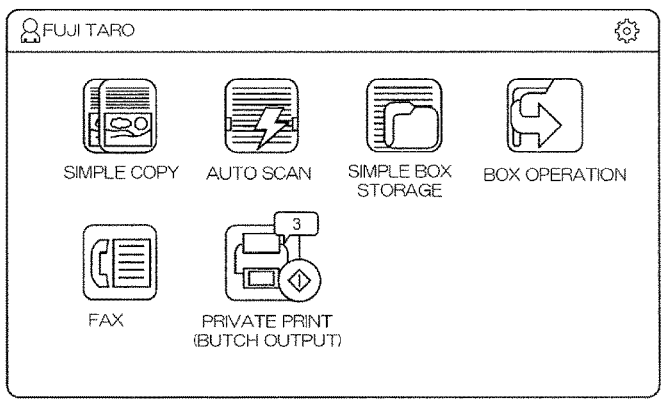
FIGS. 12A to 12D are diagrams showing examples of a guide screen displayed on the user interface in the face authentication process.
Figure 12B:
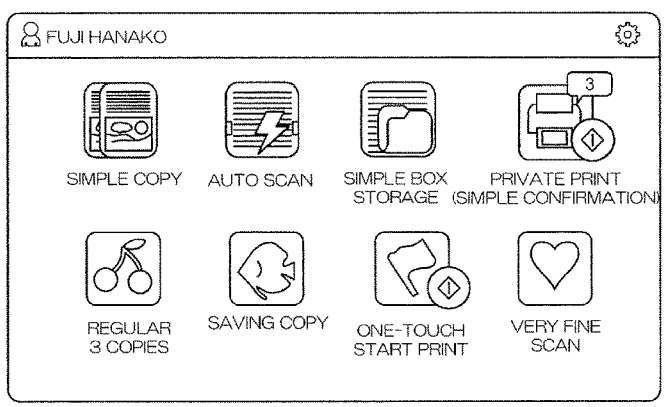
Figure 12C:
Figure 12D:
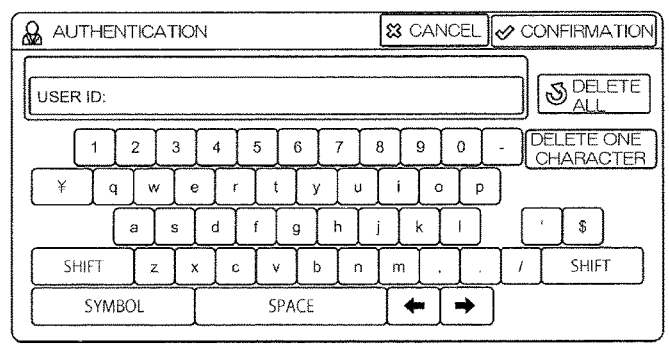

FIGS. 12A to 12D are diagrams showing examples of the UI screen displayed on the user interface 13 (more specifically, the touch panel 130) in the face authentication process shown in FIG. 9. Here, FIGS. 12A and 12B show examples of the UI screen of the object person displayed on the touch panel 130 (post-authentication screen) in step 67 shown in FIG. 9. Moreover, FIG. 12C shows an example of the UI screen indicating that the authentication has failed displayed on the touch panel 130 (pre-authentication screen) in step 70 shown in FIG. 9. Further, FIG. 12D shows an example of the UI screen for authentication by manual inputting displayed on the touch panel 130 (pre-authentication screen) in step 73 shown in FIG. 9.

First, the UI screen shown in FIG. 12A is displayed in step 67 in the case where the object person is "Fuji Taro", who is a registered person registered to the registration table (refer to FIG. 10A), "Fuji Taro" is registered as the tracked person to the tracking table (refer to FIG. 10B) (YES in step 61), the facial information of "Fuji Taro" is registered to the tracking table (YES in step 62), and thereby, authentication has succeeded (YES) in step 65. In the UI screen, according to the registration table of "Fuji Taro" shown in FIG. 10A, the user name and the buttons of respective applications (in this example, 6) are displayed. Then, in the touch panel 130, by pressing down any of these buttons, an application function associated with the button is executed.

Next, the UI screen shown in FIG. 12B is displayed in step 67 in the case where the object person is "Fuji Hanako", who is a different registered person registered to the registration table (refer to FIG. 10A), "Fuji Hanako" is registered as the tracked person to the tracking table (refer to FIG. 10B) (YES in step 61), the facial information of "Fuji Hanako" is registered to the tracking table (YES in step 62), and thereby, authentication has succeeded (YES) in step 65. In the UI screen, according to the registration table of "Fuji Hanako" shown in FIG. 10A, the user name and the buttons of respective applications in this example, 8) are displayed. Then, in the touch panel 130, by pressing down any of these buttons, an application function associated with the button is executed.

Subsequently, the UI screen shown in FIG. 12C is displayed in step 70 in the case where the object person is an unregistered person (for example, "Fuji Jiro") not registered to the registration table (refer to FIG. 10A), "Fuji Jiro" is registered as the tracked person to the tracking table (refer to FIG. 10B) (YES in step 61), the facial information of "Fuji Jiro" is registered to the tracking table (YES in step 62), and thereby, authentication has failed (NO) in step 65. In this UI screen, for example, the words "Authentication failed" and the "Close" button are displayed.

Finally, the UI screen shown in FIG. 12D is displayed in step 73 in the case where the object person is a registered person (here, the registered person is assumed to be "Fuji Taro", but the person may be "Fuji Hanako") registered to the registration table (refer to FIG. 10A), and "Fuji Taro" is not registered as the tracked person to the tracking table (refer to FIG. 10B) (NO in step 61). Moreover, the UI screen shown in FIG. 121) is displayed in step 73 in the case where the object person is a registered person (here, the registered person is assumed to be "Fuji Taro", but the person may be "Fuji Hanako") registered to the registration table (refer to FIG. 10A), "Fuji Taro" is registered as the tracked person to the tracking table (refer to FIG. 10B) (YES in step 62), and the facial information of "Fuji Taro" is not registered to the tracking table (NO in step 62). Further, the UI screen shown in FIG. 12D is displayed in step 73 in the case where the object person is an unregistered person (for example, "Fuji Jiro") registered to the registration table (refer to FIG. 10A), and "Fuji Taro" is not registered as the tracked person to the tracking table (NO in step 61). Still further, the UI screen shown in FIG. 12D is displayed in step 73 in the case where the object person is an unregistered person (for example, "Fuji Jiro") not registered to the registration table (refer to FIG. 1.0A), "Fuji Jiro" is registered as the tracked person to the tracking table (refer to FIG. 10B) (YES in step 61), and the facial information of "Fuji Jiro" is not registered to the tracking table (NO in step 62). The UI screen is displayed for accepting an authentication request by manual inputting of the user. In the UI screen, a virtual keyboard, a display area for displaying inputted contents a user ID or a password) using the virtual keyboard, a "Cancel" button and a "Confirm" button are displayed.

In this manner, in the exemplary embodiment, contents of the post-authentication screen (when the authentication has succeeded) shown in FIGS. 12A and 12B, contents of the pre-authentication screen (when the authentication has failed) shown in FIG. 12C and contents of the pre-authentication screen (when the authentication is impossible) corresponding to manual inputting shown in FIG. 12D are different. Moreover, in the exemplary embodiment, as shown in FIGS. 12A and 12B, the contents of the post-authentication screen are different for each registered person.

Here, with respect to the tracked person, simple description will be given of a ease in which the facial image is detectable and a case in which the facial image is undetectable.

Figure 13A:
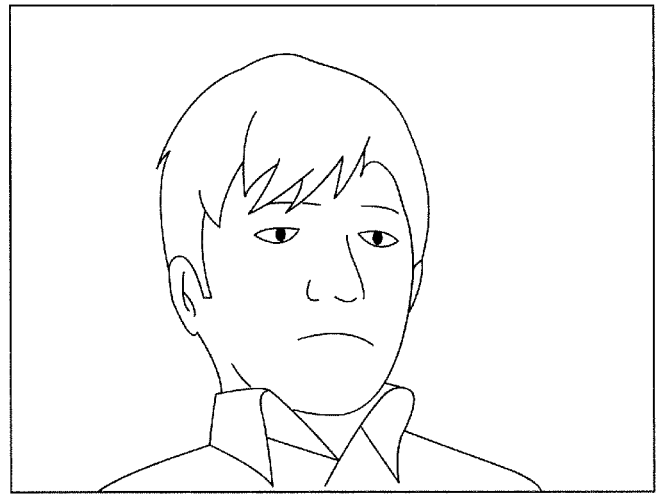
FIGS. 13A and 13B are diagrams each showing an example of a first camera image captured by a first camera.
Figure 13B:

FIGS. 13A and 13B are diagrams each showing an example of a first camera image captured by the first camera 15. Here, FIG. 13A shows a first camera image obtained by capturing an image of a face of a person H who does not wear a mask or the like, and FIG. 13B shows a first camera image obtained by capturing an image of a face of a person H who is wearing a mask.

In the face registration authentication unit 112 of the exemplary embodiment, in the face registration and face authentication, feature points in plural facial parts, such as eyes, nose, mouth and the like (for example, 14 parts or more), are detected, and after correcting the size or orientation of the face three-dimensionally, a feature amount of the face is extracted. For this reason, if the person H wears an item covering part of his/her face, such as a mask or sunglasses, even though there is an image including the face of the person H in the first camera images, it becomes impossible to detect the feature points and to extract the feature amount of the face from the first camera images. Moreover, in a case where the person H faces right beside or rearward relative to the first camera 15, it becomes impossible to detect the feature points and to extract the feature amount from the first camera image. In such a case, in step 26 shown in FIG. 8, negative determination (NO) is made.

Next, simple description will be given of, in a case where plural items of facial information can be obtained with respect to the same tracked person, how to select one facial information item.

Figure 14A:
FIGS. 14A and 14B are diagrams each showing an example of another first camera image captured by a first camera.
Figure 14B:

FIGS. 14A and 14B are diagrams each showing an example of another first camera image captured by the first camera 15. Here, FIG. 14A shows a first camera image obtained by capturing an image of a person H existing at a position relatively far from the face sensing limit L in the human sensing range R1, and FIG. 14B shows a first camera image obtained by capturing an image of a person H existing at a position relatively close to the face sensing limit L in the human sensing range R1.

As is obvious from FIGS. 14A and 14B, since the person H approaches the first camera 15, the image of the face shown in NG. 14B is larger (larger in the number of pixels) than the image of the face shown in FIG. 14A, and accordingly, the feature amount is more likely to be extracted. Consequently, for example, in a case where the facial information of the person H is obtained from the first camera image shown in FIG. 14A and registered to the tracking table, and thereafter the facial information is obtained from the first camera image shown in FIG. 14B, the latter facial information is selected and the former facial information is deleted in step 29.

Moreover, other than this, in a case where the facial information is obtained from the first camera image capturing an image of the person H facing obliquely to the first camera 15 and registered to the tracking table, and thereafter the facial information is obtained from the first camera image capturing an image of the face of the person. H facing the front with respect to the first camera 15, it may be possible to select the latter facial information and to delete the former facial information in step 29.

Note that, in the above-described first example, description has been given of the case where the second person H2 enters into the entry sensing range R3 prior to the first person H1, and therefore the second person H2 becomes the object person. However, if the first person H1 enters into the entry sensing range R3 prior to the second person H2, and the first person H1 becomes the object person.

Second Example

FIGS. 15A to 15D are diagrams showing a second example of temporal changes in positions of persons H existing around the image forming apparatus 10. Here, similar to the first example shown in FIGS. 11A to 11E, FIGS. 15A to 15 D exemplify the case where entry of any of the persons H existing in the human sensing range R1 into the entry sensing range R3 from the human sensing range R1 is utilized as the instruction to start the face authentication process in step 40.

FIG. 15A shows a situation in which the first person H1 enters into the human sensing range R1 from the outside of the human sensing range R1, and the second person H2 is positioned on the outside of the human sensing range R1. At this time, with respect to the first person H1, positive determination (YES) is made in step 22 and negative determination (NO) is made in step 23, and accordingly, the tracking ID is assigned to the first person H1 in step 24 to start tracking, and a search for the face of the first person H1 is carried out in step 25. Note that, at this time, since the second person H2 exists outside of the human sensing range R1, the second person 112 does not become an object of processing.

FIG. 15B shows a situation in which the first person H1 moves within the human sensing range R1, and the second person H2 has entered into the human sensing range R1 from the outside of the human sensing range R1. At this time, with respect to the first person H1, negative determination (NO) is made in step 23, and accordingly, a search for the face of the first person H1 is continuously carried out. Moreover, at this time, with respect to the second person H2, positive determination (YES) is made in step 22 and negative determination (NO) is made in step 23, and accordingly, the tracking ID is assigned to the second person H2 in step 24 to start tracking, and a search for the face of the second person H2 is carried out in step 25.

FIG. 15C shows a situation in which the first person H1 moves from the human sensing range R1 to the outside of the human sensing range R1, and the second person H2 is moving within the human sensing range R1. At this time, with respect to the first person H1, negative determination (NO) is made in step 31, and accordingly, the tracking ID and the facial information of the first person H1 are deleted from the tracking table in step 32. Moreover, at this time, with respect to the second person H2, negative determination (NO) is made in step 23, and accordingly, a search for the face of the second person H2 is continuously carried out.

FIG. 15D shows a situation in which the first person. H1 moves outside the human sensing range R1, and the second person H2 has moved from the human sensing range R1 to the outside of the human sensing range R1. At this time, with respect to the second person H2, negative determination (NO) is made in step 31, and accordingly, the tracking ID and the facial information of the second person H2 are deleted from the tracking table in step 32. Note that, at this time, since the first person H1 exists outside of the human sensing range R1, the first person H1 does not become an object of processing.

With this configuration, as long as the first person H1 or the second person H2, who is tracked in the human sensing range R1, does not enter into the entry sensing range R3, the object person is not generated, and as a result, the face authentication process in step 60 is not started.

Third Example

FIGS. 16A to 16E are diagrams showing a third example of temporal changes in positions of persons H existing around the image forming apparatus 10. Here, different from the above-described first and second examples, FIGS. 16A to 16E exemplify the case where the fact that an elapsed time from entry of any person H, who is existing in the human sensing range R1, into the human sensing range R1 (a stay time in the human sensing range R1) reaches a predetermined stipulated time example of a set time) is utilized as an instruction to start the face authentication process in step 40.

FIG. 16A shows a situation in which the first person H1 enters into the human sensing range R1 from the outside of the human sensing range R1, and the second person H2 is positioned on the outside of the human sensing range R1. At this time, with respect to the first person H1, positive determination (YES) is made in step 22 and negative determination (NO) is made in step 23, and accordingly, the tracking ID is assigned to the first person H1 in step 24 to start tracking, and a search for the face of the first person H1 is carried out in step 25. Moreover, time measurement using a timer is started with entry of the first person H1 from the outside of the human sensing range R1 into the human sensing range R1 as a trigger, and a first stay time T1, in which the first person H1 stays within the human sensing range R1, is set to 0 (T1=0). Note that, at this time, since the second person H2 exists outside of the human sensing range R1, the second person H2 does not become an object of processing.

FIG. 16B shows a situation in which the first person moves within the human sensing range R1, and the second person H2 has entered into the human sensing range R1 from the outside of the human sensing range R1. At this time, with respect to the first person H1, negative determination (NO) is made in step 23, and accordingly, a search for the face of the first person H1 is continuously carried out. Moreover, at this time, with respect to the second person H2, positive determination (YES) is made in step 22 and negative determination (NO) is made in step 23, and accordingly, the tracking ID is assigned to the second person H2 in step 24 to start tracking, and a search for the face of the second person H2 is carried out in step 25. Further, time measurement using the timer is started with entry of the second person H2 from the outside of the human sensing range R1 into the human sensing range R1 as a trigger, and a second stay time T2, in which the second person H2 stays within the human sensing range R1, is set to 0 (T2=0). Note that, at this time, with a lapse of time from the situation shown in FIG. 16A, the first stay time of the first person H1 is longer than the second stay time of the second person H2 (T1>T2).

FIG. 16C shows a situation in which the first person H1 is moving within the human sensing range R1, and the second person H2 is also moving within the human sensing range R1. At this time, with respect to the first person H1, negative determination (NO) is made in step 23, and accordingly, a search for the face of the first person H1 is continuously carried out. Moreover, at this time, with respect to the second person H2, negative determination (NO) is also made in step 23, and accordingly, a search for the face of the second person H2 is continuously carried out. Further, at this time, the first stay time T1 of the first person H1 has reached the stipulated time T0 (T1=T0), and the second stay time T2 of the second person H2 is shorter than the first stay time T1, namely, the stipulated time T0 (T2<T0). In the third example shown in FIGS. 16A to 16E, in the case where a time in which a specific person H (in this example, the first person H1) stays in the human sensing range R1 (in this example, the first stay time T1) reaches the stipulated time T0, the instruction unit 113 outputs the instruction to start, the face authentication process; accordingly; positive determination (YES) is made in step 40 and thereby the face authentication process in step 60 is started. Consequently, in this example, the selection unit 114 selects the first person H1 as the object person from the two tracked persons (the first person H1 and the second person H2).

Here, in the third example, even if, after the specific person H (in this example, the first person H1) is selected as the object person because his/her first stay time T1 reaches the stipulated time T0, the second stay time T2 of a different person H (in this example, the second person H2) reaches the stipulated time T0 in a state in which the specific person H continuously stays within the human sensing range R1, the object person is not changed to the different person from the specific person.

FIG. 16D shows a situation in which the first person H1 enters into the approach sensing range R4 from the human sensing range R1 via the entry sensing range R3, and the second person H2 is moving within the human sensing range R1. In this example, before the object person (here, the first person H1) entered into the entry sensing range R3 breaks through the face sensing limit L, each processing in step 61 to step 65 is completed. Moreover, in this example, before the object person (here, the first person H1) entered into the entry sensing range R3 breaks through the face sensing limit L, notification in step 66, step 69 or step 72 is performed. With this, the projector 17 displays a message M on the screen 18. Here, the contents of the message M are same as those described by use of FIGS. 11A to 11E.

With this configuration, in the case where the authentication has succeeded, the first person H1, who is the object person, is going to straightly approach the image forming apparatus 10. Moreover, in the case where the authentication has failed or the facial image is unavailable, the first person H1, who is the object person, knows the fact that the authentication has not succeeded before breaking through the face sensing limit L on which it becomes difficult to obtain a facial image using the first camera 15.

FIG. 16E shows a situation in which the first person H1 in the approach sensing range R4 is going to enter into the human operation range R2, and the second person H2 is continuously existing in the human sensing range R1. In this example, the projector 17 finishes notification of the message M during the shift from the situation shown in FIG. 16D to the situation shown in FIG. 16E. Moreover, in this example, before the object person (here, the first person H1) who has entered into the entry sensing range R3 enters into the human operation range R2, the display in step 67, step 70 or step 73 is carried out. Here, the contents of the display are same as those described by use of FIGS. 12A to 12D.

With this configuration, in the situation in which the first person H1, who is the object person and with whom the face authentication process has been performed, enters into the human operation range R2 and stands in front of the user interface 13, the UI screen corresponding to the first person H1 has already been displayed on the touch panel 130.

Note that, in the above-described third example, description has been given of the case where the first stay time T1 of the first person H1 reaches the stipulated time T0 prior to the second stay time T2 of the second person H2, and therefore the first person H1 becomes the object person. However, in the case where the second stay time T2 of the second person H2 reaches the stipulated time T0 prior to the first stay time T1 of the first person H1, the second person H2 becomes the object person.

Moreover, in the above-described third example, description has been given of the case where both of the first person H1 and the second person H2 enter into the human sensing range R1 and thereafter, continuously stay within the human sensing range R1. However, for example, in the case where the first person H1 exits to the outside of the human sensing range R1 before the first stay time T1 of the first person H1 reaches the stipulated time T0 and the second person H2 exits to the outside of the human sensing range R1 before the second, stay time T2 of the second person H2 reaches the stipulated time T0, similar to the above-described second example, the object person is not generated and the face authentication process in step 60 is not started.

Fourth Example

FIGS. 17A to 17E are diagrams showing a fourth example of temporal changes in positions of persons H existing around the image forming apparatus 10. Here, different from the above-described first to third examples, FIGS. 17A to 17E exemplify the case where, an approach of any of the persons H existing in the human sensing range R1 to the image forming apparatus 10 after entering into the human sensing range R1 is utilized as the instruction to start the face authentication process in step 40.

FIG. 17A shows a situation in which the first person H1 enters into the human sensing range R1 from the outside of the human sensing range R1, and the second person H2 is positioned on the outside of the human sensing range R1. At this time, with respect to the first person H1, positive determination (YES) is made in step 22 and negative determination (NO) is made in step 23, and accordingly, the tracking ID is assigned to the first person H1 in step 24 to start tracking, and a search for the face of the first person H1 is carried out in step 25. Note that, at this time, since the second person H2 exists outside of the human sensing range R1, the second person H2 does not become an object of processing.

FIG. 17B shows a situation in which the first person H1 moves within the human sensing range R1, and the second person H2 has entered into the human sensing range R1 from the outside of the human sensing range R1. At this time, with respect to the first person H1, negative determination (NO) is made in step 23, and accordingly, a search for the face of the first person H1 is continuously carried out. Moreover, at this time, with respect to the second person H2, positive determination (YES) is made in step 22 and negative determination (NO) is made in step 23, and accordingly, the tracking ID is assigned to the second person H2 in step 24 to start tracking, and a search for the face of the second person H2 is carried out in step 25.

FIG. 17C shows a situation in which the first person H1 is moving within the human sensing range R1, and the second person H2 is also moving within the human sensing range R1. However, at this time, the first person H1 is moving in the direction away from the image forming apparatus 10, and the second person H2 is moving in the direction approaching the image forming apparatus 10. In the fourth example shown in FIGS. 17A to 17E, in the case where an approach of a specific person H (in this example, the second person H2) to the image forming apparatus 10 (the first camera 15) is detected, the instruction unit 113 outputs the instruction to start the face authentication process, and accordingly, positive determination (YES) is made in step 40 and thereby the face authentication process in step 60 is started. Consequently, in this example, the selection unit 114 selects the second person H2 as the object person from the two tracked persons (the first person and the second person H2).

Here, in the fourth example, even if, after the specific person H (in this example, the second person H2) is selected as the object person due to the approach to the image forming apparatus 10, a different person H (in this example, the first person H1) approaches the image forming apparatus 10 in a state in which the specific person H continuously approaches the image forming apparatus 10, the object person is not changed to the different person H from the specific person H.

FIG. 17D shows a situation in which the first person H1 moves from the inside of the human sensing range R1 to the outside of the human sensing range R1, and the second person H2 has entered into the approach sensing range R4 from the human sensing range R1 via the entry sensing range R3. In this example, before the object person (here, the second person H2) entered into the entry sensing range R3 breaks through the face sensing limit L, each processing in step 61 to step 65 is completed. Moreover, in this example, before the object person (here, the second person H2) entered into the entry sensing range R3 breaks through the face sensing limit L, notification in step 66, step 69 or step 72 is performed. With this, the projector 17 displays a message M on the screen 18. Here, the contents of the message M are same as those described by use of FIGS. 11A to 11E.

With this configuration, in the case where the authentication has succeeded, the second person H2, who is the object person, is going to straightly approach the image forming apparatus 10. Moreover, in the case where the authentication has failed or the facial image is unavailable, the second person H2, who is the object person, knows the fact that the authentication has not succeeded before breaking through the face sensing limit L on which it becomes difficult to obtain a facial image using the first camera 15.

Note that, in the situation shown in FIG. 17D, with respect to the first person H1, negative determination (NO) is made in step 31, and accordingly, the tracking ID and the facial information of the first person H1 are deleted from the tracking table in step 32.

FIG. 17E shows a situation in which the first person H1 is moving at the outside of the human sensing range R1, and the second person H2 in the approach sensing range R4 is going to enter into the human operation range R2. In this example, the projector 17 finishes notification of the message M during the shift from the situation shown in FIG. 17D to the situation shown in FIG. 17E. Moreover, in this example, before the object person (here, the second person H2) who has entered into the entry sensing range R3 enters into the human operation range R2, the display in step 67, step 70 or step 73 is carried out. Here, the contents of the display are same as those described by use of FIGS. 12A to 12D.

With this configuration, in the situation in which the second person H2, who is the object person and with whom the face authentication has been performed, enters into the human operation range R2 and stands in front of the user interface 13, the UI screen corresponding to the second person H2 has already been displayed on the touch panel 130.

Note that, in the above-described fourth example, description has been given of the case where, while the second person H2 existing in the human sensing range R1 approaches the image forming apparatus 10, the first person H1 existing in the same human sensing range R1 moves away from the image forming apparatus 10, and therefore the second person H2 becomes the object person. However, in the case where, while the first person H1 existing in the human sensing range R1 approaches the image forming apparatus 10, the second person H2 existing in the same human sensing range R1 moves away from the image forming apparatus 10, the first person H1 becomes the object person.

Moreover, in the above-described fourth example, description has been given of the case where, while the second person H2 existing in the human sensing range R1 approaches the image forming apparatus 10, the first person H1 existing in the same human sensing range R1 moves away from the image forming apparatus 10. However, in the case where both of these first person H1 and second person H2 move away from the image forming apparatus 10, similar to the above-described second example, the object person is not generated, and the face authentication process in step 60 is not started. On the other hand, in the case where both of these first person H1 and second person H2 approach the image forming apparatus 10, the person H who approaches the image forming apparatus 10 earlier becomes the object person.

Here, in the above-described first to fourth examples, the case in which the two persons H (the first person H1 and the second person H2) exist around the image forming apparatus 10 is taken as an example; however, a case in which there is one person H existing around the image forming apparatus 10 and a case in which there are three or more persons H existing around the image forming apparatus 10 are also possible.

Note that, in the exemplary embodiment, in the case where the facial information of the object person (the tracked person) is not registered (NO) in step 62 of the face authentication process shown in FIG. 9, the UT screen for manual-input authentication (FIG. 121)) is displayed on the touch panel 130 in step 71, to thereby accept the authentication by manual inputting; however, the process is not limited thereto. For example, by use of the second camera 16 provided to the user interface 13, the face authentication may be performed again by capturing the facial image of the person H staying within the human operation range R2 and obtaining the facial information by the captured second camera image. In this case, on the touch panel 130, together with an instruction to encourage capturing the facial image by use of the second camera 16, the second camera image can be displayed.

Moreover, in the exemplary embodiment, in the mode control of the image forming apparatus 10 shown in FIG. 6, detection of the face of the person H is started in step 7 after the shift from the sleep mode to the normal mode in step 6; however, the process is not limited thereto. For example, detection of the face of the person H may be started with the start of the process of detecting the movement of the person H in step 4. In this case, detection of the face of the person H is started while the image forming apparatus 10 is still set to the sleep mode. Moreover, in the case where the configuration that starts detection of the face of the person H in a state being set to the sleep mode, the image forming apparatus 10 may be shifted from the sleep mode to the normal mode with, for example, the instruction to start the face authentication process given in step 40 shown in FIG. 7(YES in step 40) serving as an impetus.

Further, in the exemplary embodiment, description has been given of the case in which the projector 17 displaying an image is used as the notification unit 115 taken as an example; however, the notification unit 115 is not limited thereto. For example, a technique such as emitting a sound from a sound source, emitting light from a light source or the like may be used. Here, in the exemplary embodiment, notification is performed when authentication by the obtained facial image has succeeded (step 66), when authentication by the obtained facial image has failed (step 69), and when authentication is impossible because the facial image is not obtained (step 72); however, the timing of notification is not limited thereto. The notification may be performed during each period: (1) before the facial image is detected from the first camera images; (2) after the facial image is detected from the first camera images and before the authentication by the facial image is carried out; and (3) after the authentication process is carried out.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication device comprising:
   at least one hardware processor configured to implement:
   a storing unit configured to store a first facial image;
   an image capturing unit configured to capture a second facial image of a person in response to the person entering a first positional range extending from an apparatus including the authentication device;
   a detection unit configured to detect the person entering a second positional range extending from the apparatus, the second positional range being closer to the apparatus than the first positional range;
   a controller configured to, in response to the detection unit detecting the person entering the second positional range shift the apparatus to a normal mode from a sleep mode;
   a selection unit configured to, in response to the detection unit detecting the person entering the second positional range, select a facial image of the person who entered the second positional range from facial images of a plurality of persons captured by the image capturing unit;
   an authentication unit to perform authentication by comparing the second facial image selected by the selection unit and the first facial image; and
   a notification unit configured to before the person has broken through a face sensing limit, provide a notification about whether authentication by the authentication unit has succeeded or failed.

2. The authentication device according to claim 1, wherein the at least one hardware processor is further configured to implement:
   controlling the image capturing unit to capture the image of the person also existing in a first region, wherein
   the selection unit is further configured to select, from the facial images of the plurality of persons, a facial image of the person existing in a second region, which is in the first region and narrower than the first region, in response to the person coming into the second region.

3. The authentication device according to claim 1, wherein the at least one hardware processor is further configured to implement:
   controlling the image capturing unit to capture the image of the person also existing in a first region, wherein
   the selection unit is further configured to select, from the facial images of the plurality of persons, the facial image of the person staying in the first region for a predetermined set time or more.

4. The authentication device according to claim 1, wherein the at least one hardware processor is further configured to implement:
   controlling the image capturing unit to capture image of the person also existing in a first region, wherein
   the selection unit is further configured to select, from the facial images of the plurality of persons, the facial image of the person approaching the apparatus.

5. The authentication device according to claim 1, wherein the hardware processor is further configured to implement:
   a retaining unit configured to retain the facial images of the plurality of persons also captured by the image capturing unit, wherein
   the retaining unit is further configured to extract and retain, from the plurality of facial images captured by the image capturing unit, a facial image satisfying a predetermined condition.

6. The authentication device according to claim 1, wherein the hardware processor is further configured to implement:
   a retaining unit configured to retain the facial images of the plurality of persons also captured by the image capturing unit, wherein,
   in a case in which the image capturing unit is further configured to capture the facial images of the plurality of persons, the retaining unit is further configured to retain each of the facial images and to delete one of the facial images of a second person who exits a predetermined range.

7. The authentication device according to claim 5, wherein the retaining unit is further configured to, after the authentication unit performs authentication, delete the facial images of the plurality of persons other than the facial image of the person used in the authentication in response to the person exiting a predetermined range.

8. The authentication device according to claim 6, wherein the retaining unit is further configured to, after the authentication unit performs the authentication, delete the facial images of the plurality of persons other than the facial image of the person used in the authentication.

9. An authentication method comprising:
   storing a first facial image;
   capturing a second facial image of a person in response to the person entering a first positional range extending from an apparatus;
   detecting the person entering a second positional range extending from the apparatus, the second positional range being closer to the apparatus than the first positional range;
   in response to detection of the person entering the second positional range, shifting the apparatus to a normal mode from a sleep mode and selecting a second facial image of the person who entered the second positional range from facial images of a plurality of persons;
   performing an authentication comparing the second facial image and the first facial image; and
   providing, before the person has broken through a face sensing limit, a notification about whether authentication by the authentication unit has succeeded or failed.

10. The authentication device according claim 1, wherein the at least one hardware processor is further configured to implement:
    controlling the image capturing unit to capture a second image of a second person of the plurality of persons who has entered a predetermined range of the apparatus, wherein
    the selection unit is further configured to, in response to the person exiting a predetermined range, delete the image of the person and replace a selection of the person with a selection of the second person.

11. The authentication device according to claim 1, wherein
    the authentication unit is further configured to begin to perform the authentication in response to the person being located within a predetermined range of the apparatus for a predetermined amount of time.

12. The authentication device according to claim 1, wherein
    the authentication unit is further configured to begin to perform the authentication in response to the person being located within a predetermined rage of the apparatus for a longer amount of time than a second person of the plurality of persons.

13. The authentication device according to claim 1, wherein the at least one hardware processor is further configured to implement:
controlling the image capturing unit to capture the image of the person around the apparatus in response to the person entering a first positional range extending from the apparatus,
wherein the authentication unit is further configured to wait for a trigger to begin to perform the authentication, and a detection of the person begins in advance of the trigger,
wherein the trigger comprises a determination that the person has approached a second positional range after the person is detected, the second positional range extending from the apparatus and being different than the first positional range,
wherein the second positional range is within the first positional range, and
wherein the first positional range extends farther away from the authentication device than the second positional range.

14. The authentication device according to claim 1, wherein, the authentication unit is further configured to, in response to a failure of the authentication, perform a second authentication on a second image of the person the second image being captured by a second image capturing unit.

15. The authentication device according to claim 13, wherein
the hardware processor is further configured to, in a first case in which the authentication has failed and in response to a detection that the person has entered the second positional range, control a display to display a notification that the authentication has failed, and
the hardware processor is further configured to, in a second case in which the authentication has failed and in response to a detection that the person has not entered the second positional range and has left the first positional range, control a display to not display the notification.

16. The authentication device according to claim 1, wherein breaking through the face sensing limit comprises the person entering an area closer to the apparatus than where the image capturing unit is configured to capture the facial image.

17. The authentication device according to claim 1, wherein the notification unit comprises a projector, and
wherein providing the notification comprises projecting the notification onto a screen separate from the apparatus.

18. The authentication device according to claim 16, wherein the authentication unit is configured to complete the authentication unit prior to the person entering the area closer to the apparatus, and
the notification unit is configured to notify a result of the authentication before the person enters the area closer to the apparatus.

19. The authentication device according to claim 17, wherein, the at least one hardware processor is further configured to, in a case in which the authentication does not succeed, control the projector to project, prior to an entry of the user through the face sensing limit, an indication that the authentication did not succeed onto the screen.

20. The authentication device according to claim 1, wherein the notification comprises requesting the user to stop approaching the apparatus and indicating that the authentication did not succeed.

* * * * *